US012764411B2

(12) United States Patent
Di

(10) Patent No.: US 12,764,411 B2
(45) Date of Patent: Oct. 13, 2026

(54) CAMERA SWITCHING METHOD AND RELATED ELECTRONIC DEVICE

(71) Applicant: HONOR DEVICE CO., LTD., Shenzhen (CN)

(72) Inventor: Qinghua Di, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 53 days.

(21) Appl. No.: 18/834,763

(22) PCT Filed: Sep. 7, 2023

(86) PCT No.: PCT/CN2023/117484
§ 371 (c)(1),
(2) Date: Jul. 31, 2024

(87) PCT Pub. No.: WO2024/087900
PCT Pub. Date: May 2, 2024

(65) Prior Publication Data

US 2025/0126349 A1 Apr. 17, 2025

(30) Foreign Application Priority Data

Oct. 27, 2022 (CN) ......................... 202211322379.9

(51) Int. Cl.
*H04N 23/63* (2023.01)
*H04N 23/62* (2023.01)
*H04N 23/661* (2023.01)

(52) U.S. Cl.
CPC ........... *H04N 23/632* (2023.01); *H04N 23/62* (2023.01); *H04N 23/662* (2023.01)

(58) Field of Classification Search
CPC ........ H04N 23/60; H04N 23/62; H04N 23/63; H04N 23/631; H04N 23/632; H04N 23/661; H04N 23/662; H04N 7/147
See application file for complete search history.

(56) References Cited

U.S. PATENT DOCUMENTS 11,527,021 B2 * 12/2022 Ito .......................... H04N 23/90
11,977,810 B2 5/2024 Peng et al.
(Continued)

FOREIGN PATENT DOCUMENTS

CN 112887620 A 6/2021
CN 113422903 A 9/2021
(Continued)

OTHER PUBLICATIONS

R.Guntha et al;"CMAC: Collaborative multi agent computing for multi perspective multi screen immersive e-learning system";2016 International Conference on Advances in Computing, Communications and Informatics; Nov. 3, 2016;pp. 7.

*Primary Examiner* — Antoinette T Spinks

(74) *Attorney, Agent, or Firm* — WOMBLE BOND DICKINSON (US) LLP

(57) ABSTRACT

This application provides a camera switching method and related electronic device. The method includes: displaying a first interface with a preview area and a switching control on a first electronic device, where the preview area shows a first image from a first camera of the first electronic device; switching the camera to a second camera of a second electronic device at a first moment in response to a first input operation; displaying a second image from the second camera in the preview area at a second moment; responding to a second input operation on the switching control at a third moment; and displaying a third image from a third camera in the preview area at a fourth moment.

17 Claims, 28 Drawing Sheets

(56) References Cited

U.S. PATENT DOCUMENTS

| | | | | |
|---|---|---|---|---|
| 12,219,122 | B2 * | 2/2025 | Ogura | H04N 21/21805 |
| 12,363,250 | B2 * | 7/2025 | Leng | H04N 23/661 |
| 2014/0362274 | A1 | 12/2014 | Christie et al. | |
| 2019/0289194 | A1 * | 9/2019 | Cha | H04N 23/90 |
| 2023/0071355 | A1 | 3/2023 | Tamura et al. | |
| 2024/0007583 | A1 * | 1/2024 | Leng | H04N 23/63 |
| 2024/0061501 | A1 * | 2/2024 | Sung | G06V 40/16 |

FOREIGN PATENT DOCUMENTS

| | | | | |
|---|---|---|---|---|
| CN | 113426117 | A | 9/2021 | |
| CN | 114466131 | A * | 5/2022 | H04N 23/66 |
| CN | 114500822 | A | 5/2022 | |
| CN | 114866681 | A | 8/2022 | |
| CN | 115379126 | A | 11/2022 | |
| WO | 2021220892 | A1 | 11/2021 | |
| WO | 2022089294 | A1 | 5/2022 | |
| WO | 2022111727 | A1 | 6/2022 | |
| WO | 2022166521 | A1 | 8/2022 | |

* cited by examiner

CAMERA SWITCHING METHOD AND RELATED ELECTRONIC DEVICE

CROSS-REFERENCE TO RELATED APPLICATIONS

This application is a National Stage of International Application No. PCT/CN2023/117484, filed on Sep. 7, 2023, which claims priority to Chinese Patent Application No. 202211322379.9, filed on Oct. 27, 2022, both of which are hereby incorporated by reference in their entireties.

TECHNICAL FIELD

This application relates to the field of camera switching, and in particular, to a camera switching method and a related electronic device.

BACKGROUND

Virtual camera (Virtual Camera): The virtual camera is a camera used by an electronic device to invoke another electronic device to acquire an image. For example, an electronic device A and an electronic device B are provided. A communication connection may be established between the electronic device A and the electronic device B. When a user A performs video communication with a user B through the electronic device A by using communication software, a camera of the electronic device A may be used to acquire an image of the user A, and then the image of the user A is sent to the user B. A camera of the electronic device B may alternatively be used to acquire the image of the user A, and then the image of the user A is sent to the user B. During the video communication performed by the user A with the user B through the electronic device A, the camera of the electronic device A is a physical camera, and the camera of the electronic device B is a virtual camera.

How to reduce a delay in switching a front camera and a rear camera of a virtual camera by a user is a problem that technicians pay increasing attention to.

SUMMARY

Embodiments of this application provide a camera switching method and a related electronic device, to solve a problem of an excessively long delay in switching a front camera and a rear camera of a virtual camera by a user.

According to a first aspect, an embodiment of this application provides a camera switching method applied to a first electronic device, the method including: displaying, by the first electronic device, a first interface, where the first interface includes a preview area and a switching control, the preview area displays a first image, the first image is an image acquired by a first camera, and the first camera is a camera of the first electronic device; switching, by the first electronic device, a camera for image acquisition to a second camera at a first moment in response to a first input operation, where the second camera is a camera of a second electronic device; display, by the first electronic device, a second image in the preview area at a second moment, where the second image is an image acquired by the second camera, during image acquisition by the second camera, a data frame cached in a buffer carries the image acquisition parameter, and the first image is acquired by the first camera based on a parameter value of an image acquisition parameter; responding to a second input operation performed on the switching control at a third moment; and displaying, by the first electronic device, a third image in the preview area at a fourth moment, where the third image is an image acquired by a third camera, and the third camera is a camera of the second electronic device.

In the above embodiment, during image acquisition by the second camera, a data frame cached in the buffer each time carries an image acquisition parameter, which ensures that when the electronic device switches the second camera to the third camera and the electronic device checks integrity of data frames in the buffer, each data frame in the buffer is a complete data frame. Therefore, when the electronic device switches the second camera to the third camera, there is no need to reserve a certain buffer time to wait for data frames carrying image acquisition parameters to be cached in the buffer before camera switching. This greatly improves efficiency of camera switching by the electronic device.

With reference to the first aspect, in a possible implementation, the image acquisition parameter includes at least one of the following: a maximum frame rate, an exposure compensation value, and a coding scheme that are of an acquired image. In this way, the first camera may acquire, expose, and encode an image based on the maximum frame rate, the exposure compensation value, and the coding scheme in the image acquisition parameters, thereby preventing the acquired image from failing to meet a requirement of the electronic device, which otherwise causes image distortion.

With reference to the first aspect, in a possible implementation, the second electronic device is an electronic device that establishes a multi-screen collaboration connection to the first electronic device.

With reference to the first aspect, in a possible implementation, the first electronic device includes a first application, a camera service module, a physical camera module, and a virtual camera module, and before the displaying, by the first electronic device, a first interface, the method further includes: detecting a third input operation, and starting the first application; sending, by the camera service module, a first request message to the physical camera module; when it is detected that an image acquisition parameter exists in the first request message, storing, by the physical camera module, the image acquisition parameter in the virtual camera module; invoking, by the physical camera module, the first camera to acquire the first image based on the first request message; and returning, by the physical camera module, a first data frame to the first application, where the first data frame includes the first image and an image acquisition parameter. In the above embodiment, after receiving the first request message, when an image acquisition parameter exists in the first request message, the physical camera module stores the image acquisition parameter in the virtual camera module. In this way, even if no image acquisition parameter exists in a request message received by the virtual camera module during operation, when returning a data frame, the virtual camera module may add an image acquisition parameter to the data frame to ensure integrity of the returned data frame. When the electronic device switches the second camera to the third camera, because each data frame cached in the buffer is a complete data frame, during switching from the second camera to the third camera, the camera service module reserves no buffer time to wait for the virtual camera module to return the complete data frames, but immediately switches the camera, thus reducing delay duration in camera switching.

With reference to the first aspect, in a possible implementation, the switching, by the first electronic device, the camera for image acquisition to a second camera specifically includes: sending, by the first application, a first switching instruction to the camera service module; sending, by the camera service module, first indication information to the physical camera module, where the first indication information is configured to indicate the physical camera module to forward a second request message to the virtual camera module; sending, by the camera service module, the second request message to the physical camera module; sending, by the physical camera module, the second request message to the virtual camera module; invoking, by the virtual camera module, the second camera to acquire the second image based on the second request message; returning, by the virtual camera module, a second data frame to the first application, where the second data frame includes the second image and an image acquisition parameter; and caching, by the virtual camera module, the second data frame in the buffer.

With reference to the first aspect, in a possible implementation, each second data frame cached in the buffer carries an image acquisition parameter.

With reference to the first aspect, in a possible implementation, before the invoking, by the virtual camera module, the second camera to acquire the second image based on the second request message, the method further includes: detecting, by the virtual camera module, whether an image acquisition parameter exists in the second request message; and if yes, replacing, by the virtual camera module, an image acquisition parameter stored in the virtual camera module with the image acquisition parameter in the second request message.

With reference to the first aspect, in a possible implementation, after the responding to a second input operation performed on the switching control, the method further includes: determining, by the camera service module, whether each data frame in the buffer carries an image acquisition parameter; if yes, sending, by the camera service module, a third request message to the physical camera module; sending, by the physical camera module, the third request message to the virtual camera module; invoking, by the virtual camera module, the third camera to acquire the third image based on the third request message; and returning, by the virtual camera module, a third data frame to the camera service module, where the third data frame includes the third image and image acquisition information.

With reference to the first aspect, in a possible implementation, before the invoking, by the virtual camera module, the third camera to acquire the third image based on the third request message, the method further includes: detecting, by the virtual camera module, whether an image acquisition parameter exists in the third request message; and if yes, replacing, by the virtual camera module, an image acquisition parameter stored in the virtual camera module with the image acquisition parameter in the third request message.

According to a second aspect, an embodiment of this application provides an electronic device, the electronic device including: one or more processors, a display, and a memory, where the memory is coupled to the one or more processors, the memory is configured to store computer program code, the computer program code includes computer instructions, and the one or more processors invoke the computer instructions to cause the electronic device to perform the following: controlling the display to display a first interface, where the first interface includes a preview area and a switching control, the preview area displays a first image, the first image is an image acquired by a first camera, and the first camera is a camera of a first electronic device; switching, by the first electronic device, a camera for image acquisition to a second camera at a first moment in response to a first input operation, where the second camera is a camera of a second electronic device; controlling the display to display a second image in the preview area at a second moment, where the second image is an image acquired by the second camera, during image acquisition by the second camera, a data frame cached in a buffer carries the image acquisition parameter, and the first image is acquired by the second camera based on a parameter value of an image acquisition parameter; responding to a second input operation performed on the switching control at a third moment; and displaying, by the first electronic device, a third image in the preview area at a fourth moment, where the third image is an image acquired by a third camera, and the third camera is a camera of the second electronic device.

With reference to the second aspect, in a possible implementation, the one or more processors invoke the computer instructions to cause the electronic device to perform the following: detecting a third input operation, and starting a first application; sending, by a camera service module, a first request message to a physical camera module; when it is detected that an image acquisition parameter exists in the first request message, storing, by the physical camera module, the image acquisition parameter in a virtual camera module; invoking, by the physical camera module, the first camera to acquire the first image based on the first request message; and returning, by the physical camera module, a first data frame to the first application, where the first data frame includes the first image and an image acquisition parameter.

With reference to the second aspect, in a possible implementation, the one or more processors invoke the computer instructions to cause the electronic device to perform the following: sending, by the first application, a first switching instruction to the camera service module; sending, by the camera service module, first indication information to the physical camera module, where the first indication information is configured to indicate the physical camera module to forward a second request message to the virtual camera module; sending, by the camera service module, the second request message to the physical camera module; sending, by the physical camera module, the second request message to the virtual camera module; invoking, by the virtual camera module, the second camera to acquire the second image based on the second request message; returning, by the virtual camera module, a second data frame to the first application, where the second data frame includes the second image and an image acquisition parameter; and caching, by the virtual camera module, the second data frame in the buffer.

With reference to the second aspect, in a possible implementation, the one or more processors invoke the computer instructions to cause the electronic device to perform the following: detecting, by the virtual camera module, whether an image acquisition parameter exists in the second request message; and if yes, replacing, by the virtual camera module, an image acquisition parameter stored in the virtual camera module with the image acquisition parameter in the second request message.

With reference to the second aspect, in a possible implementation, the one or more processors invoke the computer instructions to cause the electronic device to perform the following: determining, by the camera service module, whether each data frame in the buffer carries an image acquisition parameter; if yes, sending, by the camera service module, a third request message to the physical camera module; sending, by the physical camera module, the third request message to the virtual camera module; invoking, by the virtual camera module, the third camera to acquire the third image based on the third request message; and returning, by the virtual camera module, a third data frame to the camera service module, where the third data frame includes the third image and image acquisition information.

With reference to the second aspect, in a possible implementation, the one or more processors invoke the computer instructions to cause the electronic device to perform the following: detecting, by the virtual camera module, whether an image acquisition parameter exists in the third request message; and if yes, replacing, by the virtual camera module, an image acquisition parameter stored in the virtual camera module with the image acquisition parameter in the third request message.

According to a third aspect, an embodiment of this application provides an electronic device, including: a touch control screen, cameras, one or more processors, and one or more memories, where the one or more processors are coupled to the touch control screen, the cameras, and the one or more memories, the one or more memories are configured to store computer program code, the computer program code includes computer instructions, and when the one or more processors execute the computer instructions, the electronic device is enabled to perform the method according to any one of the first aspect or the possible implementations of the first aspect.

According to a fourth aspect, an embodiment of this application provides a chip system. The chip system is applied to an electronic device, the chip system includes one or more processors, and the one or more processors are configured to invoke computer instructions, so that the electronic device performs the method according to any one of the first aspect or the possible implementations of the first aspect.

According to a fifth aspect, an embodiment of this application provides a computer program product including instructions. When the computer program product is run on an electronic device, the electronic device is enabled to perform the method according to any one of the first aspect or the possible implementations of the first aspect.

According to a sixth aspect, an embodiment of this application provides a computer-readable storage medium, including instructions. When the instructions are run on an electronic device, the electronic device is enabled to perform the method according to any one of the first aspect or the possible implementations of the first aspect.

DESCRIPTION OF EMBODIMENTS

Figure 1A:
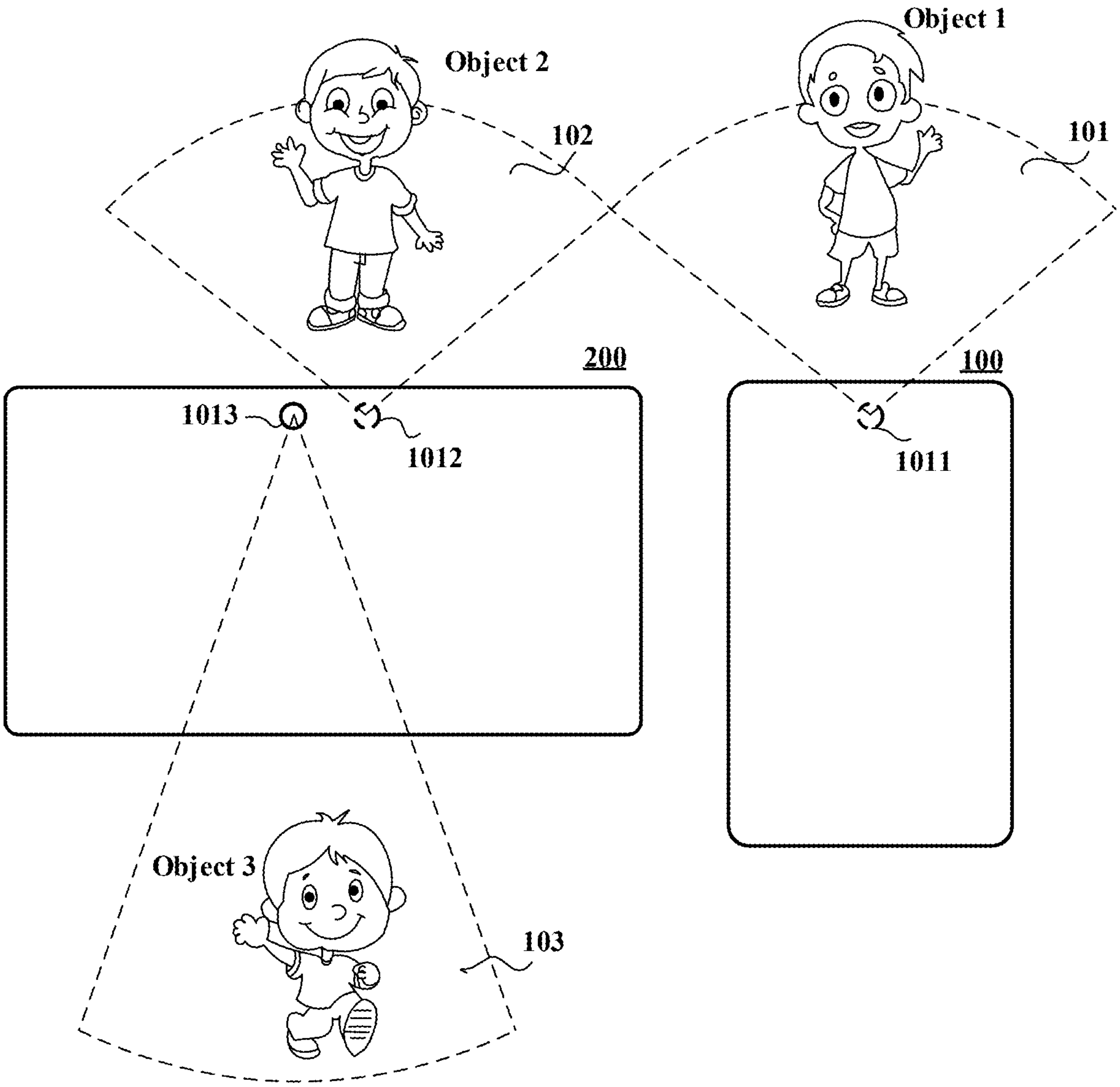
FIG. 1A to FIG. 1I are example diagrams of scenarios of a group of camera switching methods according to embodiments of this application.

The following clearly and describes technical solutions in embodiments of this application with reference to the accompanying drawings in the embodiments of this application. Apparently, the described embodiments are only some embodiments rather than all the embodiments of this application. The "embodiment" mentioned herein means that a particular feature, structure, or characteristic described with reference to the embodiments may be included in at least one embodiment of this application. This phrase appearing at various locations in the specification does not necessarily refer to the same embodiment, nor an independent or alternative embodiment exclusive of other embodiments. A person skilled in the art may explicitly and implicitly understand that the embodiments described herein may be combined with another embodiment. All other embodiments obtained by a person of ordinary skill in the art based on the embodiments of this application without creative efforts shall fall within the protection scope of this application.

The terms "first", "second", "third", and the like in the specification and claims of this application and the accompanying drawings are used to distinguish between different objects, but are not intended to describe a specific sequence. In addition, the terms "include" and "have" and any variations thereof are intended to cover a non-exclusive inclusion. For example, a series of steps or units are included, or optionally, steps or units not listed are further included, or optionally other steps or units inherent to these processes, methods, products, or devices are further included.

The accompanying drawings show merely some but not all content related to this application. Before example embodiments are described in more detail, it should be noted that some example embodiments are described as processing or methods depicted as flowcharts. Although the flowcharts describe various operations (or steps) as sequential processing, many of the operations may be implemented in parallel, concurrently, or simultaneously. In addition, a sequence of the operations may be rescheduled. The processing may be terminated when operations of the processing are completed, but there may be additional steps not included in the accompanying drawings. The processing may correspond to a method, a function, a procedure, a subroutine, a subprogram, and the like.

The terms "component", "module", "system", "unit", and the like used in this specification are used to represent computer-related entities, hardware, firmware, a combination of hardware and software, software, or software in execution. For example, the unit may be, but is not limited, to a process running on a process, a processor, an object, an executable file, a thread of execution, a program, and/or may be distributed between two or more computers. In addition, these units may be executed by various computer-readable media on which various data structures are stored. For example, a unit may communicate by using local and/or remote processes based on a signal with one or more data packets (for example, second unit data exchanged by another unit from a local system, a distributed system, and/or a network, for example, an internet that interacts with another system by using a signal).

Some technical terms used in embodiments of this application are described below.

1. Virtual camera (Virtual Camera): The virtual camera is a camera used by an electronic device to invoke another electronic device to acquire an image. For example, an electronic device A and an electronic device B are provided. A communication connection may be established between the electronic device A and the electronic device B. When a user A performs video communication with a user B through the electronic device A by using communication software, a camera of the electronic device A may be used to acquire an image of the user A, and then the image of the user A is sent to the user B. A camera of the electronic device B may alternatively be used to acquire the image of the user A, and then the image of the user A is sent to the user B. During the video communication performed by the user A with the user B through the electronic device A, the camera of the electronic device A is a physical camera, and the camera of the electronic device B is a virtual camera.
2. Multi-screen collaboration: A multi-screen collaboration function is a distributed technology that enables cross-system and cross-device collaboration. After a plurality of devices are connected, resource sharing and collaborative operation can be achieved. With multi-screen collaboration between a smartphone and tablet as an example, after the tablet enables a multi-screen collaboration function, the smartphone may be connected to the tablet, and after the connection is successful, the smartphone can transmit data with the tablet.

With different scenarios as examples, example description of a camera switching method according to an embodiment of this application is provided below.

Scenario 1: An electronic device 100 first establishes a multi-screen collaboration connection to an electronic device 200. After the multi-screen collaboration connection is established, the electronic device 100 starts a camera application. In this case, an image acquired by a camera of the electronic device 100 is displayed on an interface of the electronic device 100. When the electronic device 100 switches video/audio to the electronic device 200, an image acquired by a camera of the electronic device 200 is displayed on a user interface of the electronic device 100.

Example description of the above process is provided below with reference to FIG. 1A to FIG. 1I. It is assuming that in FIG. 1A to FIG. 1I, the electronic device 100 is a smartphone and the electronic device 200 is a tablet.

FIG. 1A is an example diagram of the electronic device 100 and the electronic device 200. The electronic device 100 includes a first camera 1011, and the first camera 1011 is a rear camera of the electronic device 100. An image that can be acquired by the first camera 1011 of the electronic device 100 is in a range of a sector area 101, and an object 1 is included in this image acquisition range. The electronic device 200 includes a second camera 1012 and a third camera 1013. The second camera 1012 is a rear camera of the electronic device 200, and the third camera 1013 is a front camera of the electronic device 200. An image that can be acquired by the second camera 1012 of the electronic device 200 is in a range of a sector area 102, and an object 2 is included in the sector area 102. An image that can be acquired by the third camera 1013 of the electronic device 200 is in a range of a sector area 103, and an object 3 is included in the sector area 103.

Figure 1B:
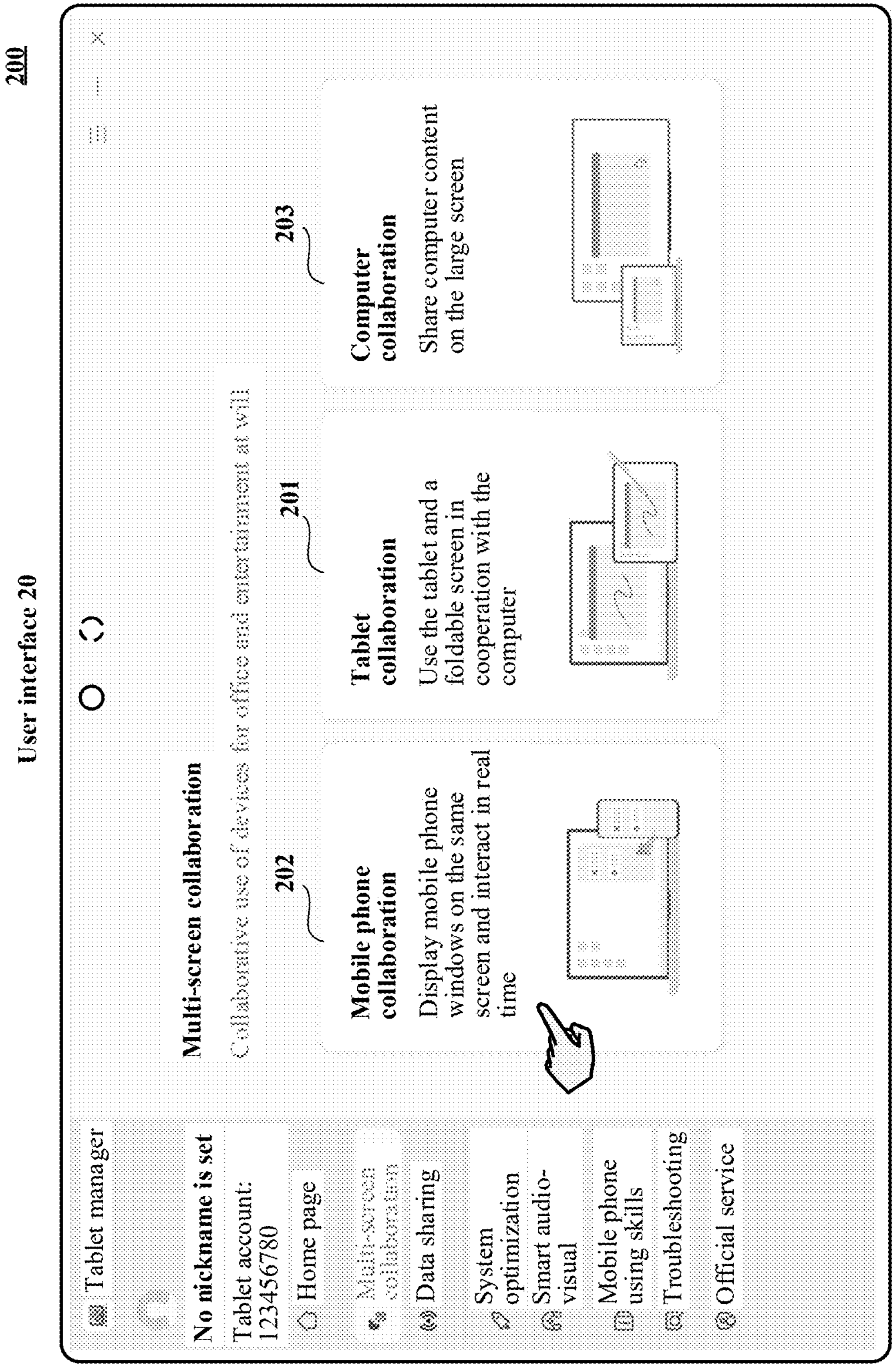

FIG. 1B shows a user interface 20 of the electronic device 200, and the user interface 20 includes functional icons such as a tablet collaboration icon 201, a mobile phone collaboration icon 202, and a computer collaboration icon 203. After detecting an input operation (for example, tapping) performed on the mobile phone collaboration icon 202, the electronic device 200 displays a user interface 21 shown in FIG. 1C in response to this operation, and a two-dimensional barcode 205 is included in the user interface 21. After the electronic device 100 performs a code scanning operation on the two-dimensional barcode 205 by using an application having a code scanning function (for example, a code scanning function of a camera application of the electronic device 100 or a code scanning function in a browser of the electronic device 100), the electronic device 100 displays a connection prompt information box 104 shown in FIG. 1D on a user interface 10. A “Disconnect” icon and a “Switch audio/video to the tablet” icon are displayed in the connection prompt information box 104, and the connection prompt information box 104 is configured to indicate that the electronic device 100 is successfully connected to a multi-screen system of the electronic device 200.

Figure 1C:
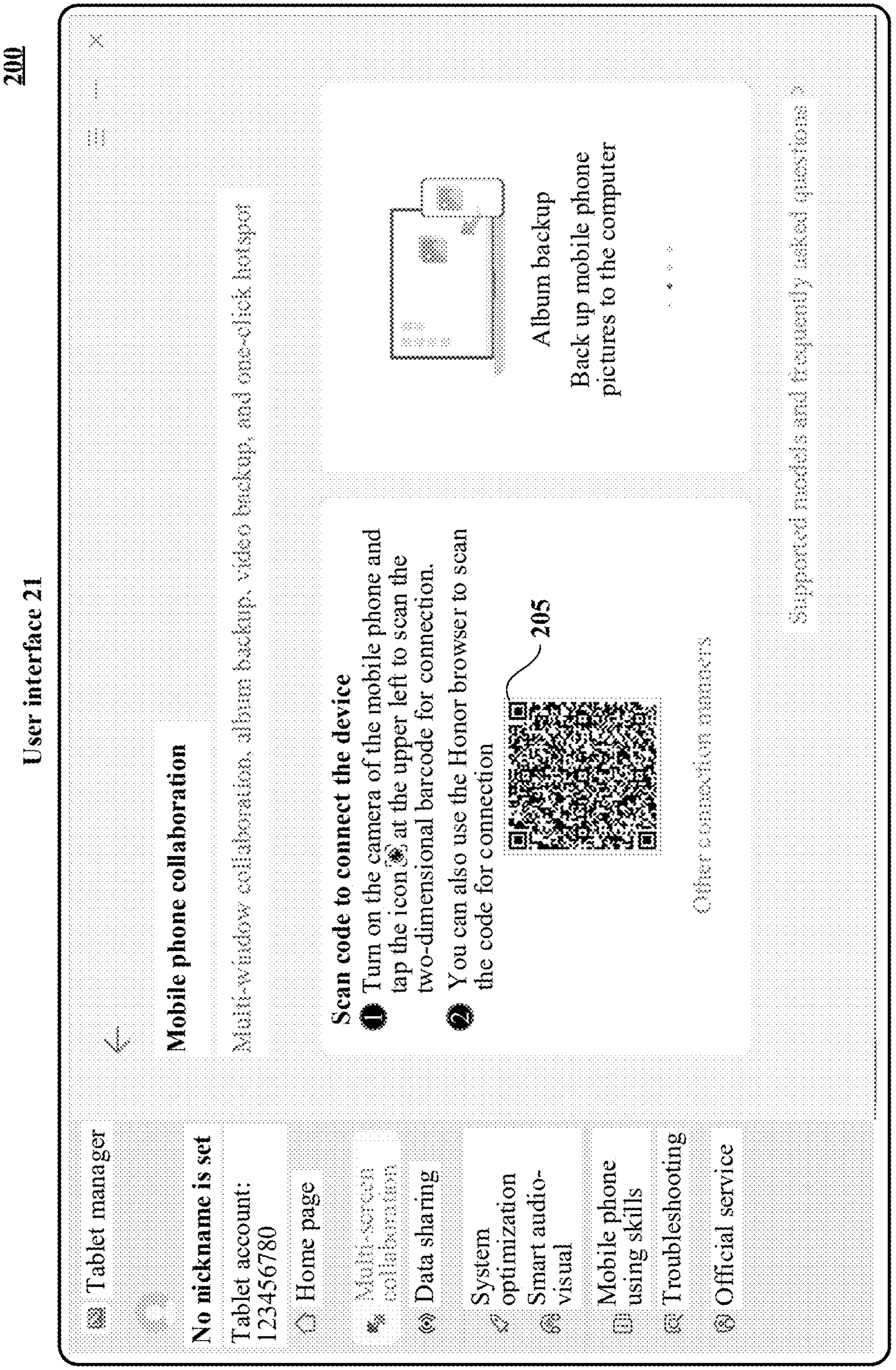
Figure 1D:
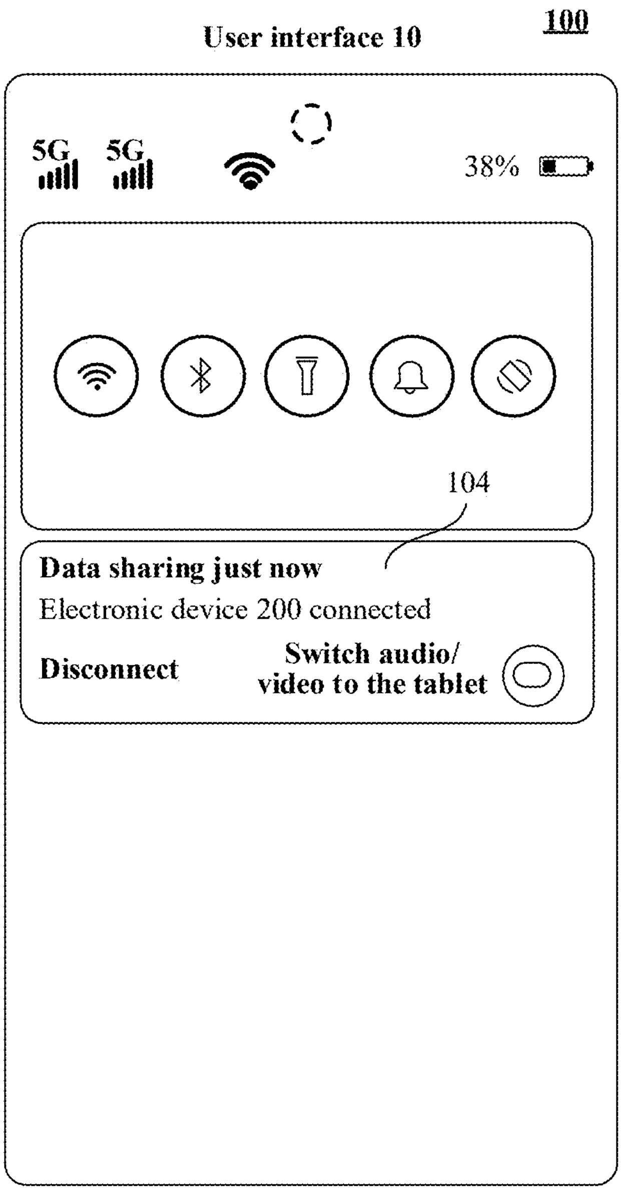

The embodiments of FIG. 1B to FIG. 1D provide example description of the process of establishing a multi-screen collaboration connection between the electronic device 100 and the electronic device 200. It should be understood that a multi-screen collaboration connection may also be performed between the electronic device 100 and the electronic device 200 in another manner. For example, when the electronic device 200 detects an input operation performed on the mobile phone collaboration icon, surrounding electronic devices can be directly searched for, and a message requesting for a connection is broadcast to a found electronic device. After the electronic device receiving the request message confirms the connection, the electronic device 200 establishes a multi-screen collaboration connection to the electronic device. In the embodiments of this application, example description of the manner of establishing a multi-screen collaboration connection between the electronic device 100 and the electronic device 200 is provided, which should not constitute any restriction on the protection scope of this application. In addition, there is no restriction on an initiating device for the multi-screen collaboration connection in the embodiments of this application. In the embodiments of FIG. 1B to FIG. 1D, the initiating device for multi-screen collaboration is the electronic device 200, or may be the electronic device 100.

Figure 1E:
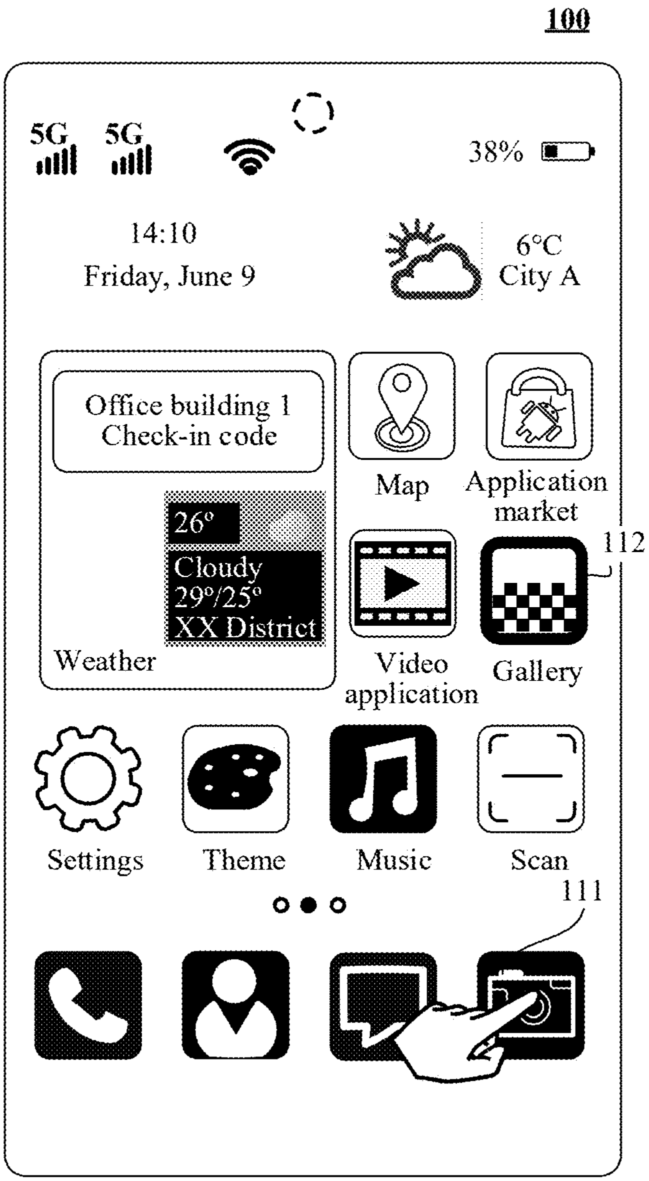

FIG. 1E shows a main interface of the electronic device 100, and the main interface of the electronic device 100 includes a camera icon 111, a gallery icon 112, and other application icons. Upon detecting an input operation (for example, tapping) performed on the camera icon 111, the electronic device 100 displays a photographing interface shown in FIG. 1F in response to this operation.

Figure 1F:
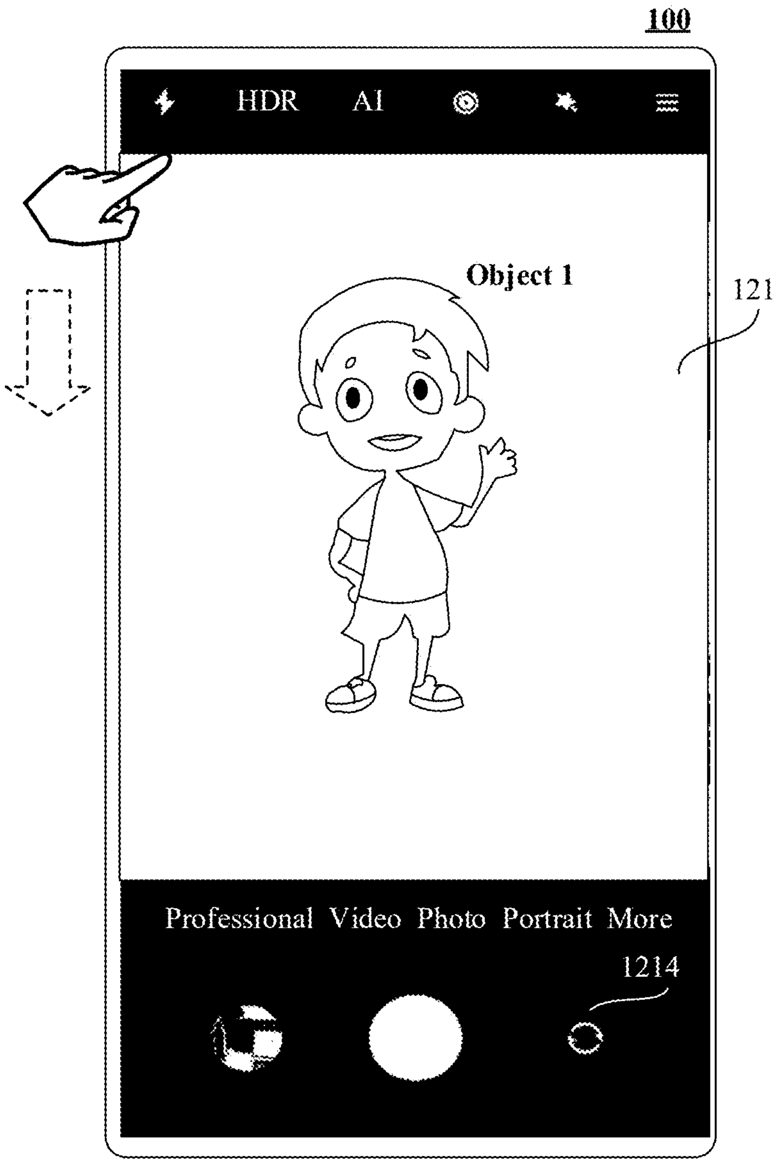

As shown in FIG. 1F, a viewfinder frame 121 is included in the photographing interface, and an image acquired by the first camera of the electronic device 100 is displayed in the viewfinder frame 121. The object 1 is displayed in this image. At a moment T1, when the electronic device 100 detects an input operation (for example, sliding down from a top of the screen) performed on the photographing interface, the electronic device 100 displays a user interface 10 shown in FIG. 1G in response to this operation.

Figure 1G:
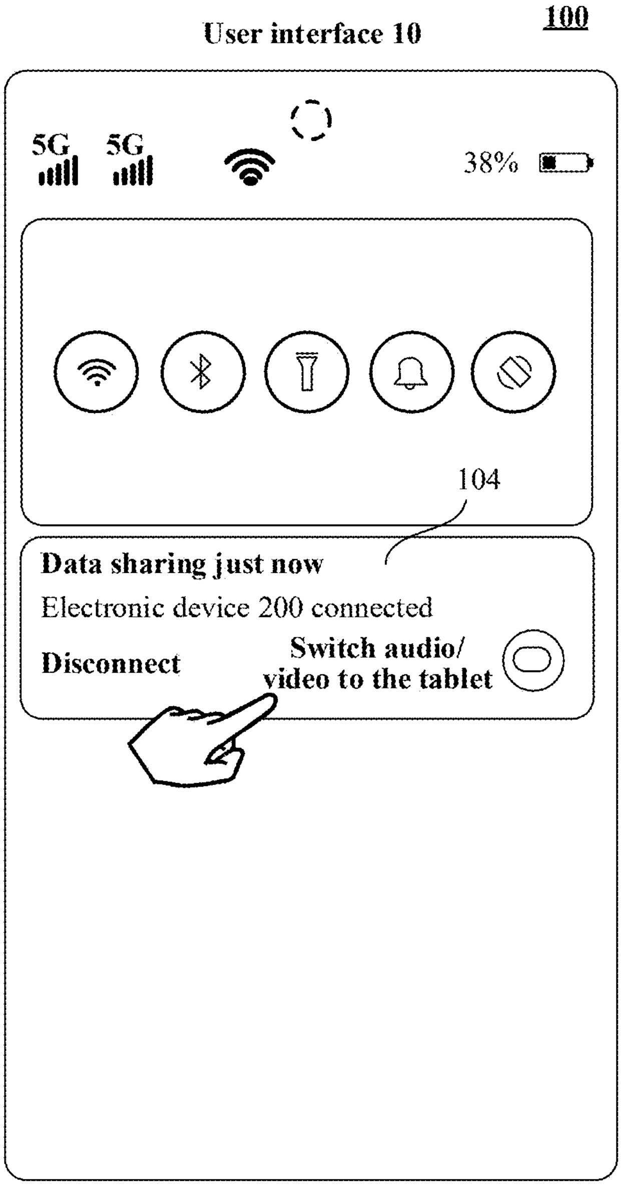

As shown in FIG. 1G, a connection prompt information box 104 is included in the user interface 10. A "Multi-screen collaboration connection succeeded", a "Disconnect" icon, and a "Switch audio/video to the tablet" icon are displayed in the connection prompt information box 104, and the connection prompt information box 104 is configured to indicate that there is a multi-screen collaboration connection between the electronic device 100 and the electronic device 200. When the electronic device 100 detects an input operation (for example, tapping) performed on the "Switch audio/video to the tablet" icon, in response to this operation, the electronic device 100 switches the first camera for image acquisition to the second camera of the electronic device 200.

Figure 1H:
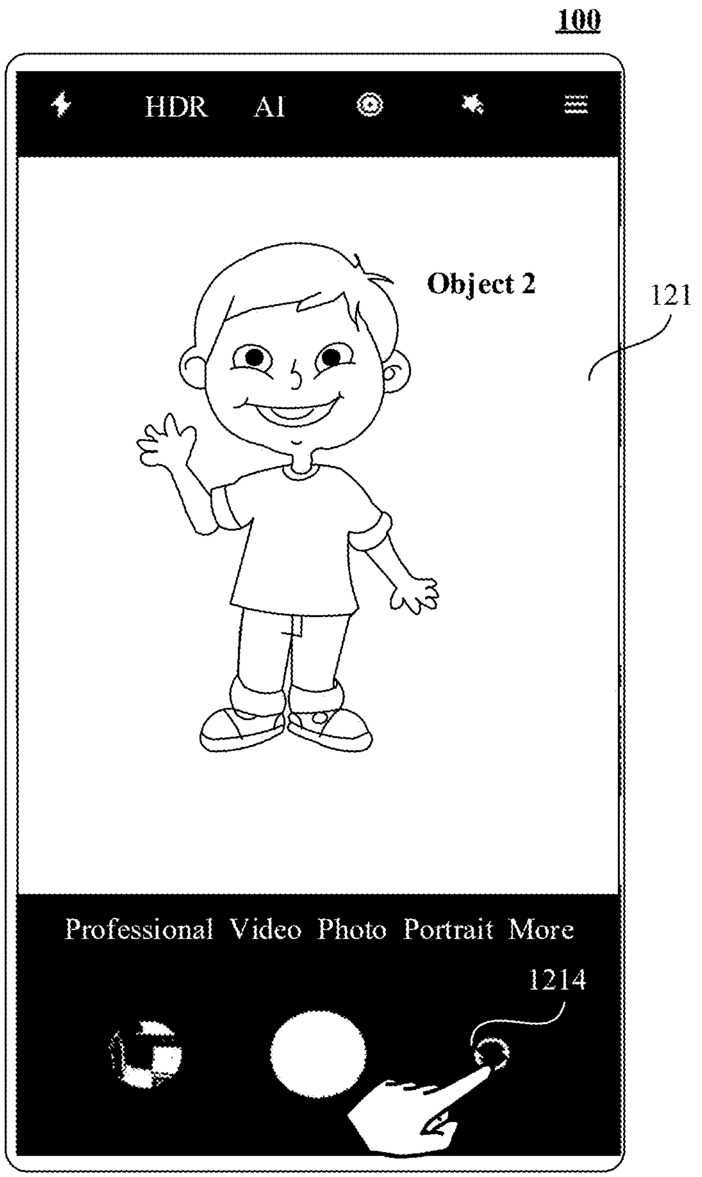
Figure 1I:
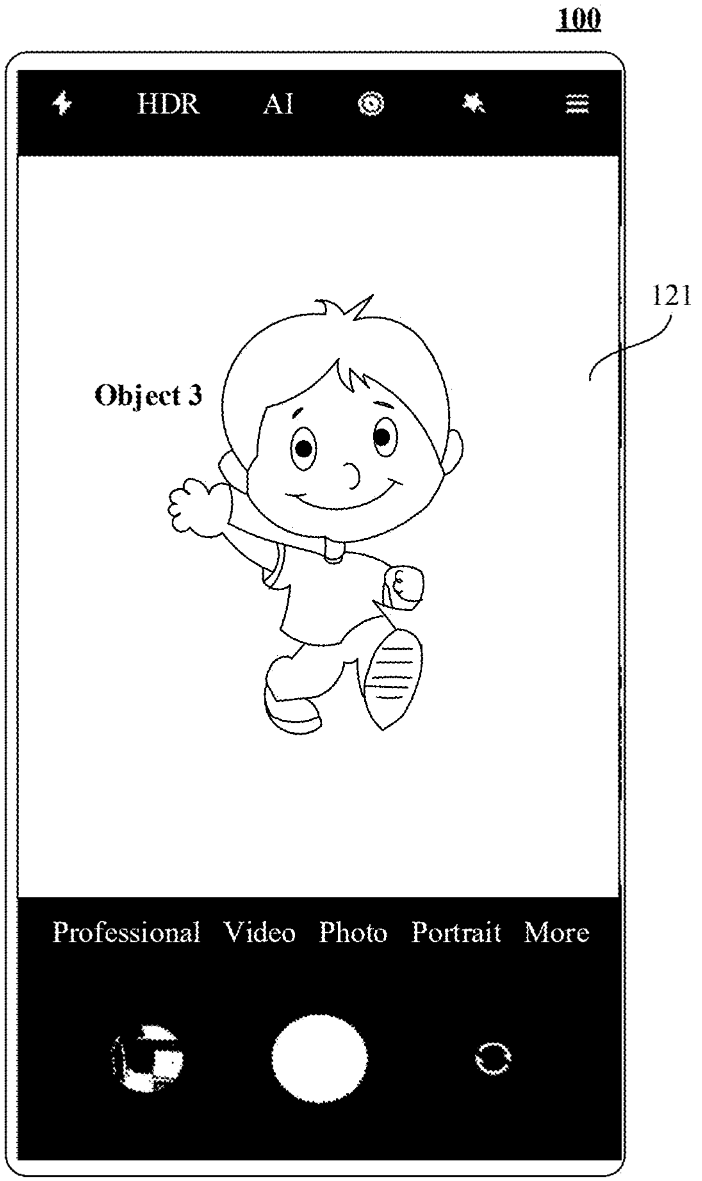

FIG. 1H shows a photographing interface of the electronic device 100 after camera switching by the electronic device 100. As shown in FIG. 1H, an image acquired by the second camera of the electronic device 200 is displayed in a viewfinder frame 121 of the photographing interface. An object 2 is included in this image. When detecting an input operation (for example, tapping) performed on a camera switching control 1214 on the photographing interface, the electronic device 100 switches the second camera of the electronic device 200 to a third camera 1031 in response to this operation, and displays a photographing interface shown in FIG. 1I. As shown in FIG. 1I, an image acquired by the third camera is displayed in a viewfinder frame 121 of the photographing interface. An object 3 is displayed in this image.

The embodiments of FIG. 1E to FIG. 1I provide example description of an application scenario in which the electronic device 100 uses the camera of the electronic device 200 to acquire an image after a multi-screen collaboration connection is established between the electronic device 100 and the electronic device 200. It should be understood that in the above embodiments, when the electronic device 100 uses the first camera thereof to acquire an image, the first camera is a physical camera, and when the electronic device 100 uses the second camera or the third camera of the electronic device 200 to acquire an image, the second camera and the third camera are virtual cameras. In addition, the physical camera and the virtual camera are relative to an execution body. For an electronic device that is running an application that uses a camera to acquire an image, the camera of the electronic device is a physical camera, and a camera of another electronic device invoked by the electronic device is a virtual camera.

Figure 2:
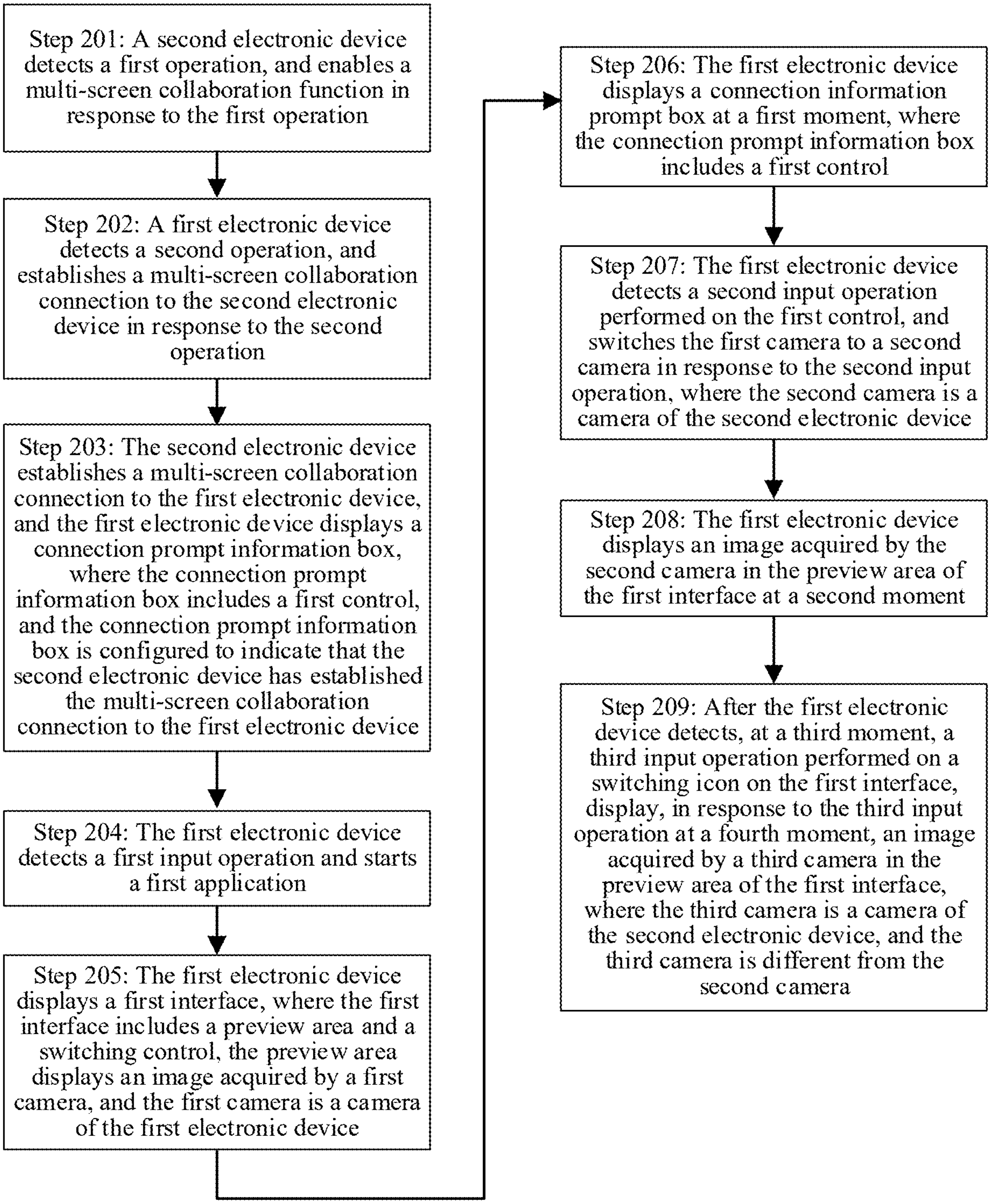
FIG. 2 is a flowchart of a camera switching method according to an embodiment of this application.

Example description of a process in which the first electronic device switches the camera of the second electronic device to perform image acquisition is provided below with reference to FIG. 2. FIG. 2 is a flowchart of a camera switching method according to an embodiment of this application, with a specific process as follows.

Step 201: A second electronic device detects a first operation, and enables a multi-screen collaboration function in response to the first operation.

For example, the second electronic device may be the electronic device 200 in the embodiment of FIG. 1A, and the first operation may be the input operation performed on the mobile phone collaboration icon 202 in FIG. 1B.

Step 202: A first electronic device detects a second operation, and establishes a multi-screen collaboration connection to the second electronic device in response to the second operation.

Optionally, the second electronic device may generate a two-dimensional barcode after enabling a multi-screen system function, and the second electronic device may establish a multi-screen collaboration connection to an electronic device that scans and parses the two-dimensional barcode. The second electronic device may alternatively search for nearby electronic devices after enabling a multi-screen collaboration function, and broadcast indication information for requesting for establishment of a multi-screen system function. After an electronic device receives the indication information and sends a message confirming the establishment of a connection to the second electronic device, the second electronic device may establish a multi-screen collaboration connection to the electronic device. The embodiment of this application provides example description of one of manners in which the second electronic device establishes a multi-screen collaboration connection to another electronic device, but does not restrict a manner in which the second electronic device establishes a multi-screen system connection to another electronic device.

Specifically, the first electronic device may be the electronic device 100 in the embodiment of FIG. 1B, and the second operation may be the code scanning operation performed by the electronic device 100 on the two-dimensional barcode 205 in the embodiment of FIG. 1B.

Step 203: The second electronic device establishes a multi-screen collaboration connection to the first electronic device, where the first electronic device displays a connection prompt information box, the connection prompt information box includes a first control, and the connection prompt information box is configured to indicate that the second electronic device has established a multi-screen collaboration connection to the first electronic device.

For example, the connection prompt information box may be the connection prompt information box 104 in FIG. 1D, and the first control may be the "Switch audio/video to the tablet" icon in the connection prompt information box 104.

Steps 201 to 203 describe the process of multi-screen system connection between the second electronic device and the first electronic device. It should be understood that steps 201 to 203 provide only example description of one of the manners of establishing a multi-screen system connection between the second electronic device and the first electronic device, that is, the second electronic device is used as an initiating device for a multi-screen system connection, and the first electronic device is used as a receiving device for a multi-screen collaboration connection. In some embodiments, the first electronic device may alternatively be used as an initiating device for a multi-screen collaboration connection, and the second electronic device is used as a receiving device for a multi-screen system connection, which is not restricted in the embodiments of this application. Steps 201 to 203 may alternatively be used as optional steps.

Step 204: The first electronic device detects a first input operation and starts a first application.

For example, the first application may be the camera application corresponding to the camera icon 111 in the embodiment of FIG. 1E, and the first input operation may be the detected input operation performed on the camera icon 111 in FIG. 1E. The first application may alternatively be an application having a photographing function, such as WeChat and a browser.

Step 205: The first electronic device displays a first interface, where the first interface includes a preview area and a switching control, the preview area displays an image acquired by a first camera, and the first camera is a camera of the first electronic device.

For example, the first interface may be the photographing interface in the embodiment of FIG. 1F, the preview area may be the viewfinder frame 121 in the embodiment of FIG. 1F, the switching control may be the switching control 1214 in the above photographing interface, and the first camera may be the first camera of the electronic device 100 in the embodiment of FIG. 1A.

Specifically, the first electronic device also starts the first camera after starting the first application. With the first camera of the first electronic device being a rear camera as an example, after the first electronic device starts the rear camera, the rear camera acquires an image and display the acquired image on the first interface.

Step 206: The first electronic device displays the connection prompt information box at a first moment, where the connection prompt information box includes a first control.

Step 207: The first electronic device detects a second input operation performed on the first control, and switches the first camera to a second camera in response to the second input operation, where the second camera is a camera of the second electronic device.

For example, the first control may be the "Switch audio/video to the tablet" icon in the embodiment of FIG. 1G, and the second input operation may be the input operation performed on the "Switch audio/video to the tablet" icon in the embodiment of FIG. 1G.

Specifically, when the first electronic device detects the second input operation performed on the first control, the first electronic device switches the first camera to the second camera of the second electronic device. In this way, the first camera no longer acquires an image, but the second camera acquires an image. Alternatively, the first camera continues to acquire an image, and the image acquired by the first camera is no longer displayed on the first interface, but the image acquired by the second camera is displayed on the first interface. This is not restricted in the embodiment of this application.

Step 208: At a second moment, the first electronic device displays, in the preview area of the first interface, an image acquired by the second camera.

Specifically, after the first electronic device switches the first camera to the second camera, the image acquired by the first camera is no longer displayed in the preview area of the first interface, but the image acquired by the second camera is displayed.

Step 209: After detecting, at a third moment, a third input operation performed on a switching icon on the first interface, in response to the third input operation, at a fourth moment, the first electronic device displays, in the preview area of the first interface, an image acquired by a third camera, where the third camera is a camera of the second electronic device, and the third camera is different from the second camera.

Steps 201 to 209 describe the process of switching, by the first electronic device during image acquisition by using the first camera of the first electronic device, the first camera to the second camera of the second electronic device to acquire an image, and switching the second camera to the third camera.

Scenario 2: After the electronic device 100 establishes a multi-screen collaboration connection to the electronic device 200, the electronic device 100 uses the camera of the electronic device 200 to perform video recording, with a video frame rate being a first frame rate. After the recording is completed, a first video file is generated, and a video frame rate of the first video file is the first frame rate. After the electronic device 100 modifies the video frame rate to a second frame rate, a second video is recorded by using the camera of the electronic device 200. After the recording is completed, a second video file is generated, and a frame rate of the second video file is a second frame rate. The two video files have different frame rates. Example description of the above process is provided below with reference to FIG. 3A to FIG. 3K.

For the related description of establishing a multi-screen collaboration connection between the electronic device 100 and the electronic device 200, reference may be made to the description in the embodiments of FIG. 1A to FIG. 1D. Details are not described herein.

Example diagrams of the electronic device 100 and the electronic device 200 are shown in FIG. 1A.

Figure 3A:
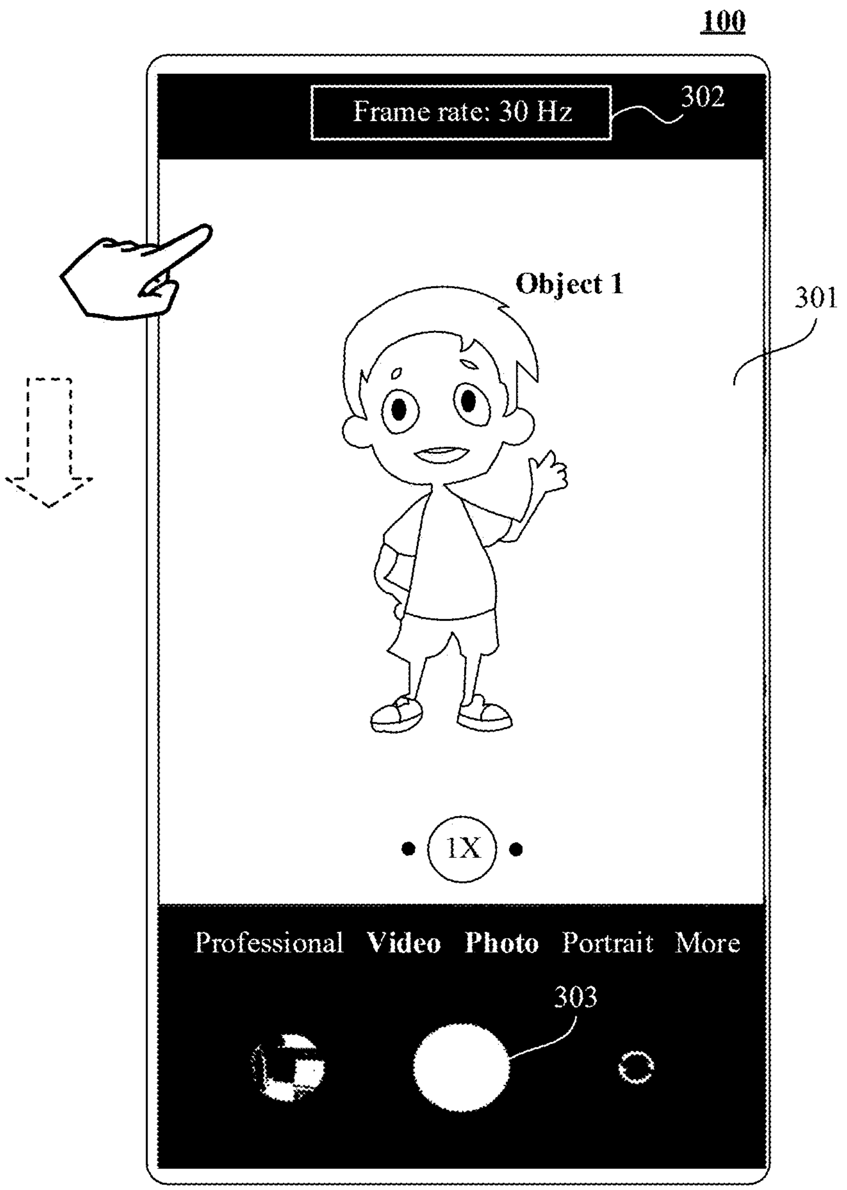
FIG. 3A to FIG. 3K are example diagrams of scenarios of another group of camera switching methods according to embodiments of this application.

FIG. 3A shows a preview interface of an electronic device 100. The preview interface includes a viewfinder frame 301, a frame rate information box 302, and a recording start control 303. The viewfinder frame 301 is configured to display an image acquired by a camera, and the frame rate information box 302 is configured to display a frame rate of video shooting. As shown in FIG. 3A, a current frame rate of video recording is 30. The image currently displayed in the viewfinder frame 301 is an image acquired by the first camera of the electronic device 100, and an object 1 is included in this image. When the electronic device 100 detects an input operation (for example, sliding down from a top of the screen) performed on the preview interface, the electronic device 100 displays a user interface shown in FIG. 3B in response to this operation.

Figure 3B:
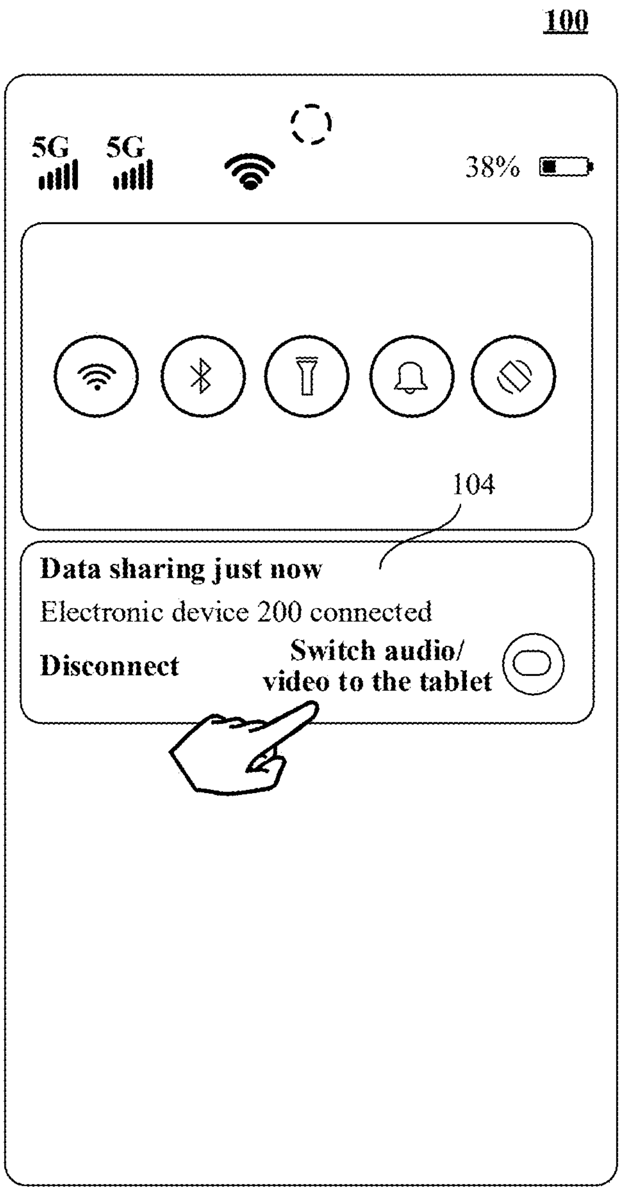

As shown in FIG. 3B, a connection prompt information box 104 is included in the user interface. A "Disconnect" icon and a "Switch audio/video to the tablet" icon are included in the connection prompt information box 104, and the connection prompt information box 104 is configured to indicate that there is a multi-screen collaboration connection between the electronic device 100 and the electronic device 200. When the electronic device 100 detects an input operation (for example, tapping) performed on the "Switch audio/video to the tablet" icon, in response to this operation, the electronic device 100 switches the first camera to the camera of the electronic device 200.

Figure 3C:
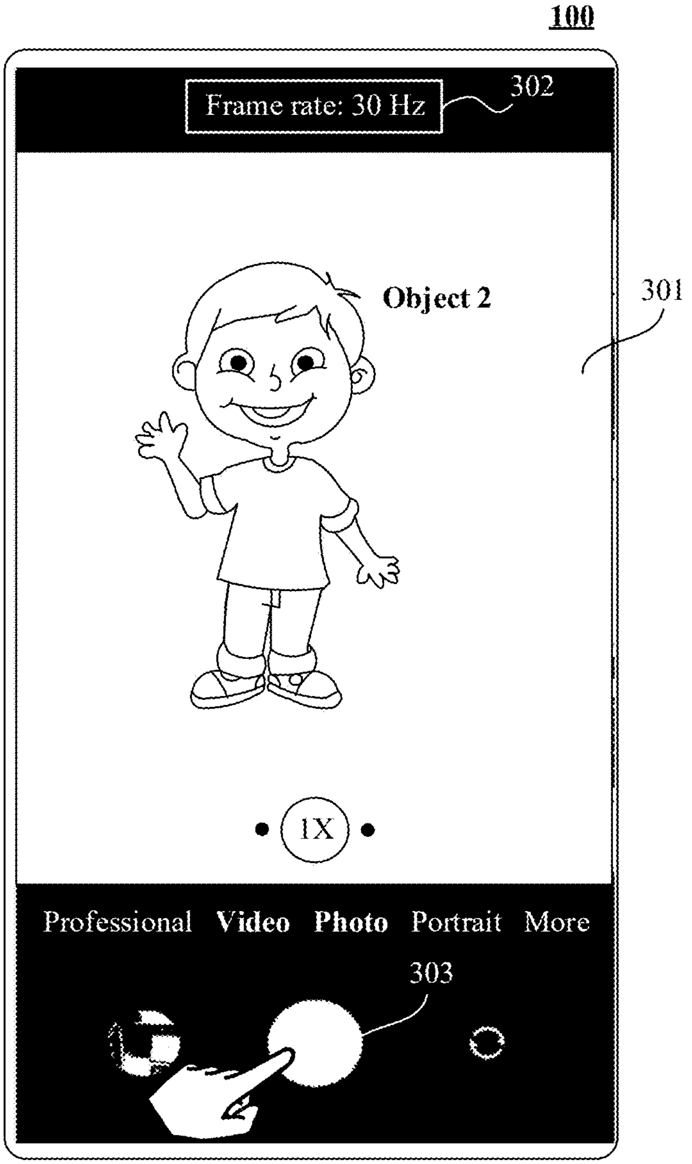

FIG. 3C shows a preview interface after the electronic device 100 switches the camera. In this case, an image acquired by the second camera of the electronic device 200 is displayed in the viewfinder frame 301. An object 2 is included in this image. An input operation (for example, tapping) performed on the recording start control 303 is detected, and the electronic device 100 starts recording a video in response to this operation, and displays a video recording interface shown in FIG. 3D.

Figure 3D:
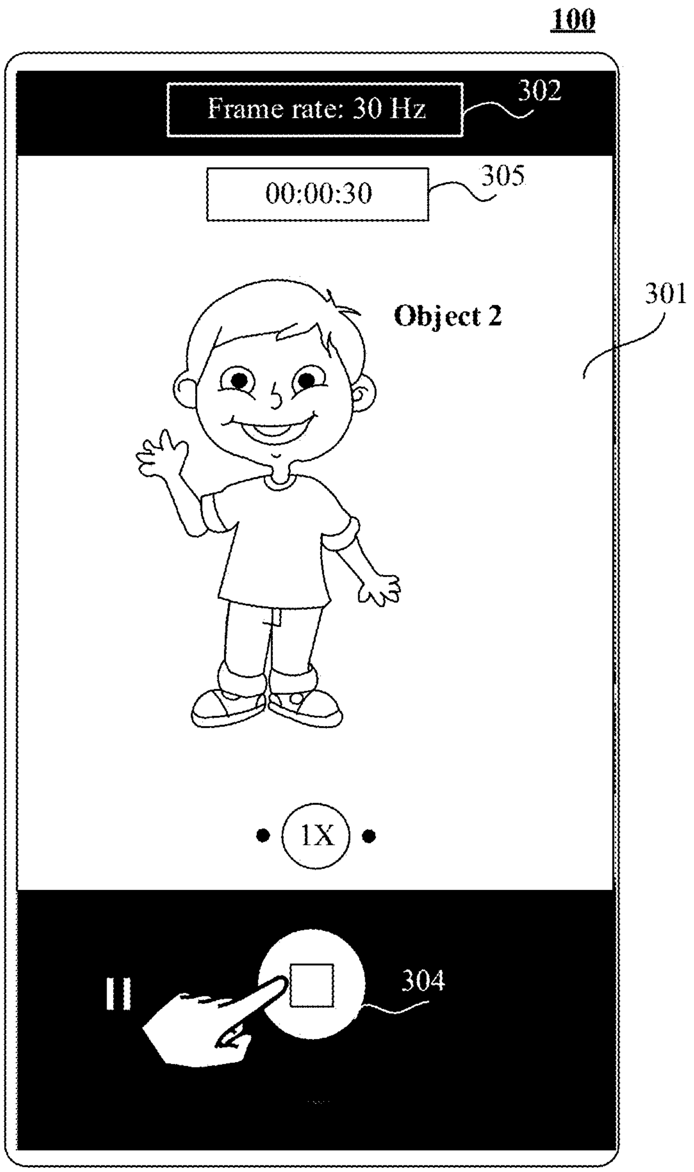

The video recording interface shown in FIG. 3D includes a recording time display box 305, a frame rate information box 302, and a recording stop control 304. From the recording time display box 305 and the frame rate information box 302, it can be seen that a recording time of a current video is 30 seconds, and the video frame rate is 30 Hz. An input operation (for example, tapping) performed on the recording stop control 304 is detected, and the electronic device 100 saves a current video file in response to this operation. The video file is a first video file, and a frame rate of the first video file is 30 Hz.

Figure 3E:
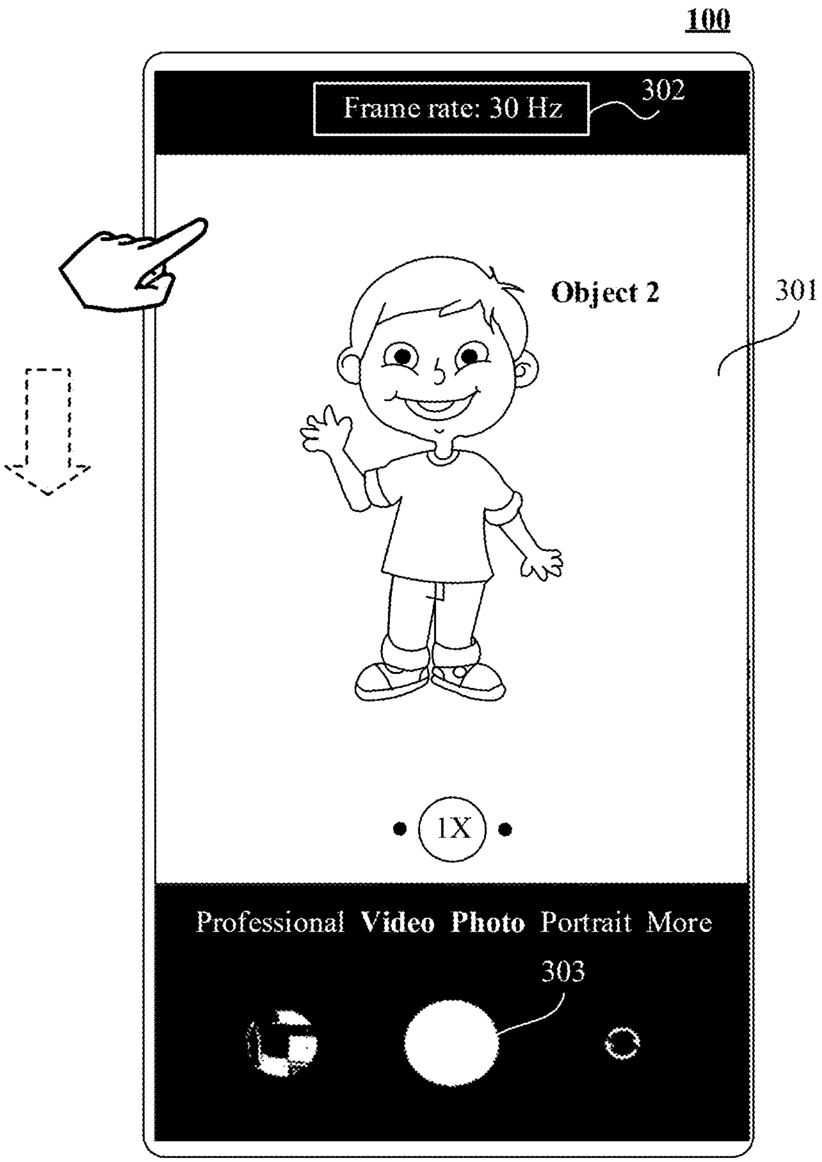

After the video recording, the electronic device 100 may display a preview interface shown in FIG. 3E. Because the electronic device 100 switches the camera to the second camera of the electronic device 200, an image acquired by the second camera is displayed in the viewfinder frame 301. An object 2 is included in this image.

Figure 3F:
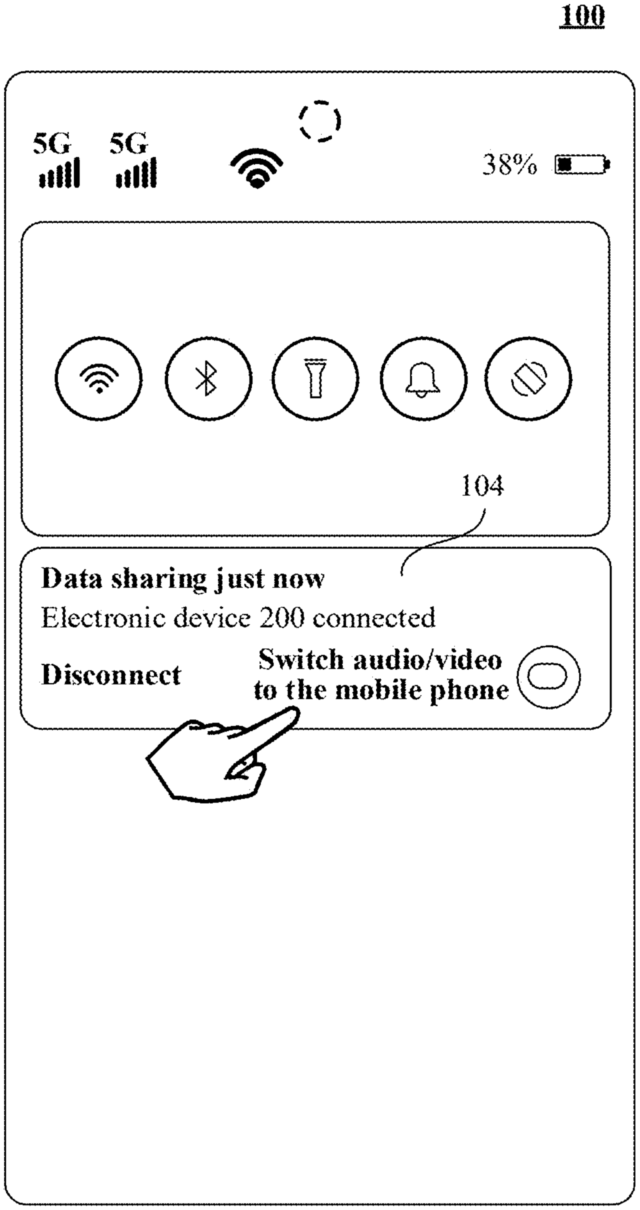

At a moment T1, when the electronic device 100 detects an input operation (for example, sliding down from a top of the screen) performed on the preview interface, the electronic device 100 displays a user interface shown in FIG. 3F in response to this operation. As shown in FIG. 3F, a connection prompt information box 104 is included in this user interface. A "Disconnect" icon and a "Switch audio/video to the mobile phone" icon are included in the connection prompt information box 104, and the connection prompt information box 104 is configured to indicate that there is a multi-screen collaboration connection between the electronic device 100 and the electronic device 200. When the electronic device 100 detects an input operation (for example, tapping) performed on the "Switch audio/video to the mobile phone" icon, in response to this operation, the electronic device 100 switches the second camera to the first camera of the electronic device 100.

Figure 3G:
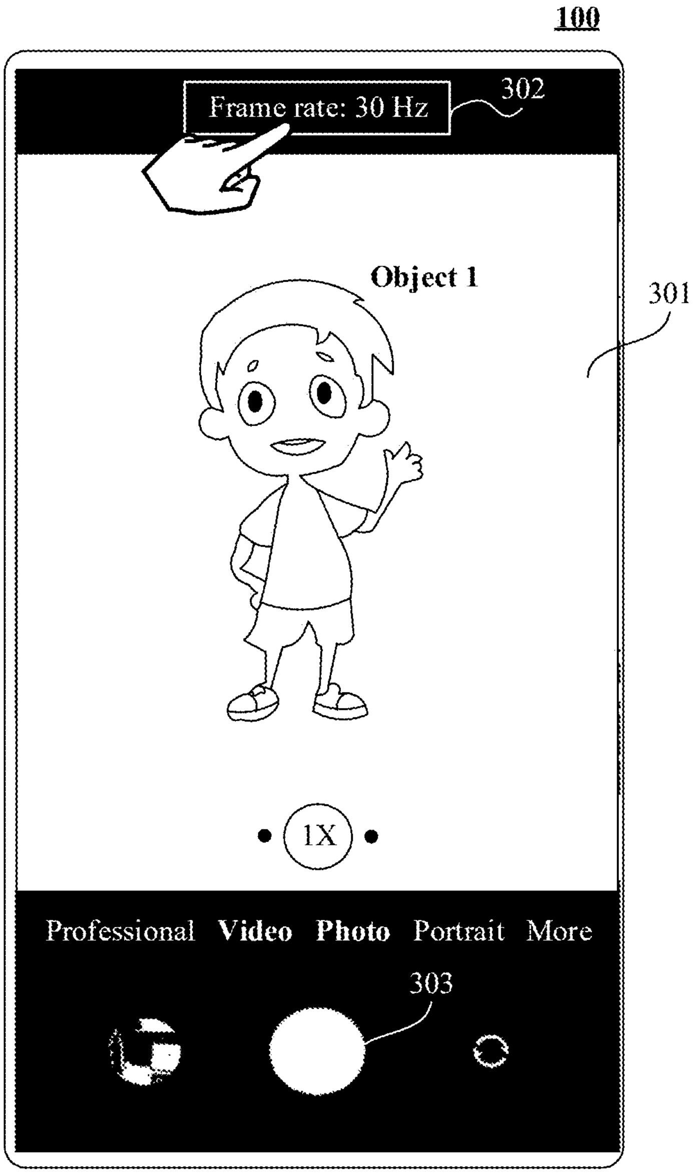

FIG. 3G shows a preview interface after the electronic device 100 switches the camera. In this case, an image acquired by the first camera of the electronic device 100 is displayed in the viewfinder frame 301. An object 1 is included in this image. An input operation (for example, tapping) performed on the frame rate information box 302 is detected, and the electronic device 100 changes the video frame rate in response to this operation. It should be understood that the embodiment of this application only provides example description of one of manners of changing the frame rate, and the manners of changing the video frame rate are not restricted in the embodiments of this application.

Figure 3H:
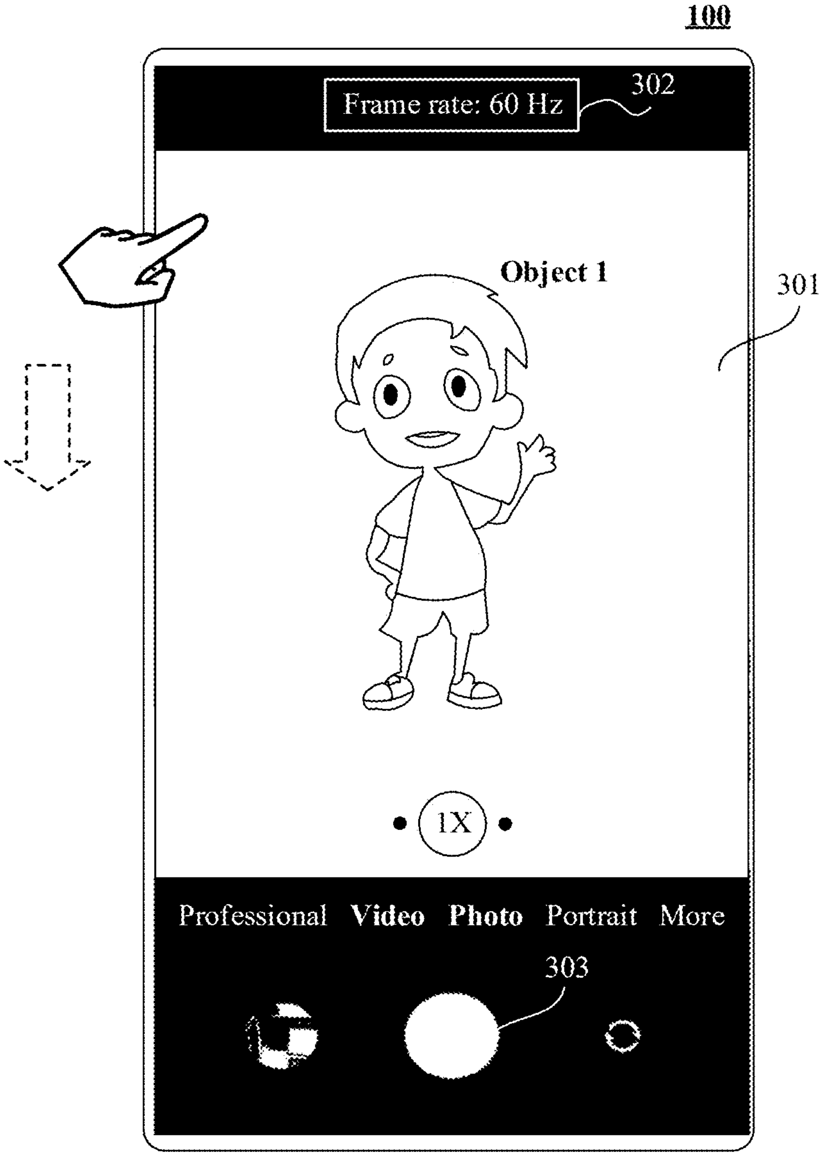

As shown in FIG. 3H, it can be seen from the frame rate information box 302 that the video frame rate in this case is 60 Hz. When the electronic device 100 detects an input operation (for example, sliding down from a top of the screen) performed on the preview interface, the electronic device 100 displays a user interface shown in FIG. 3I in response to this operation.

Figure 3I:
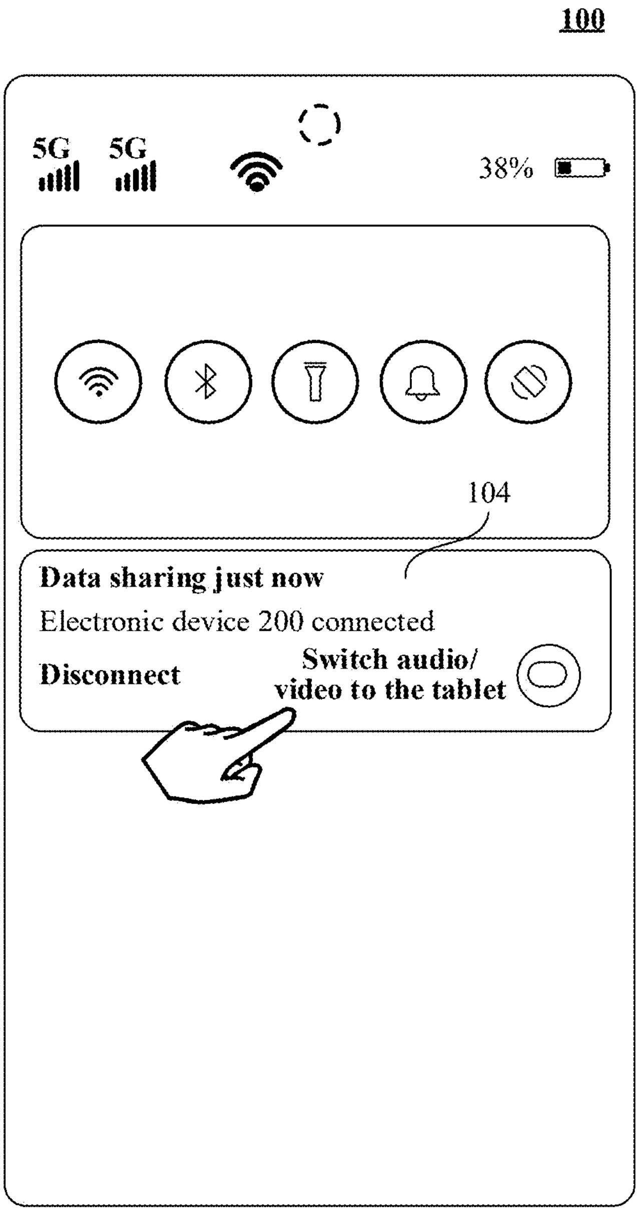

As shown in FIG. 3I, a connection prompt information box 104 is included in the user interface. A "Disconnect" icon and a "Switch audio/video to the tablet" icon are included in the connection prompt information box 104, and the connection prompt information box 104 is configured to indicate that there is a multi-screen collaboration connection between the electronic device 100 and the electronic device 200. When the electronic device 100 detects an input operation (for example, tapping) performed on the "Switch audio/video to the tablet" icon, in response to this operation, the electronic device 100 switches the first camera to the camera of the electronic device 200.

Figure 3J:
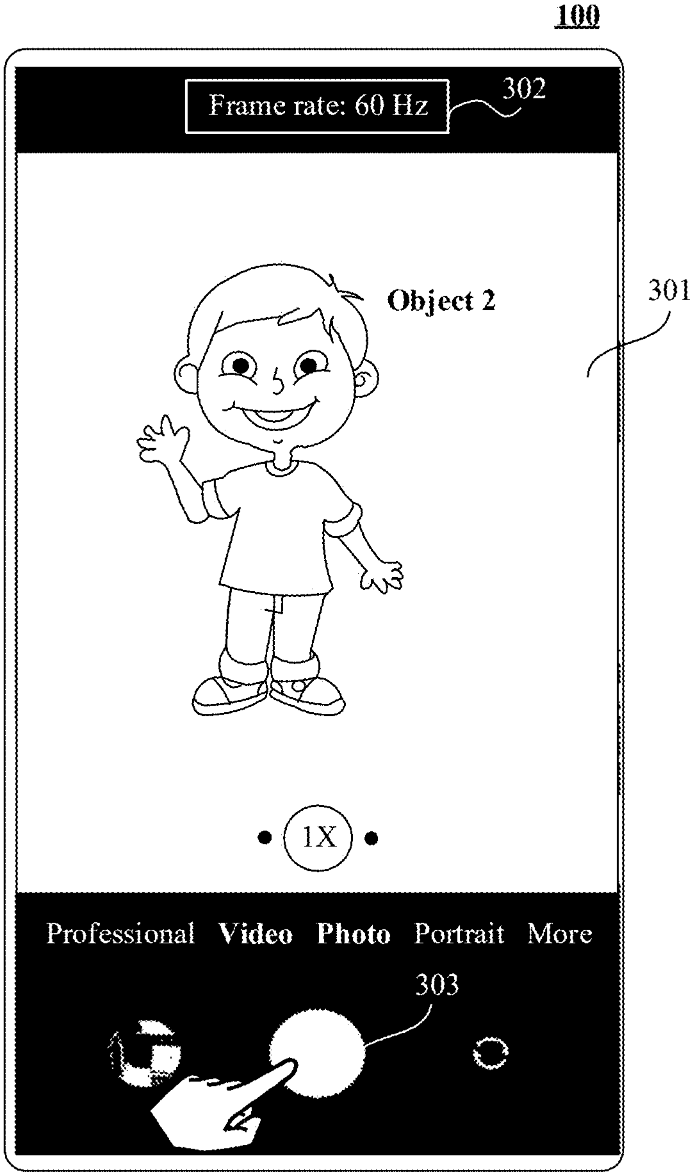

FIG. 3J shows a preview interface after the electronic device 100 switches the camera. In this case, an image acquired by the second camera of the electronic device 200 is displayed in the viewfinder frame 301. An object 2 is included in this image. An input operation (for example, tapping) performed on the recording start control is detected, and the electronic device 100 starts recording a video in response to this operation, and displays a video recording interface shown in FIG. 3K.

Figure 3K:
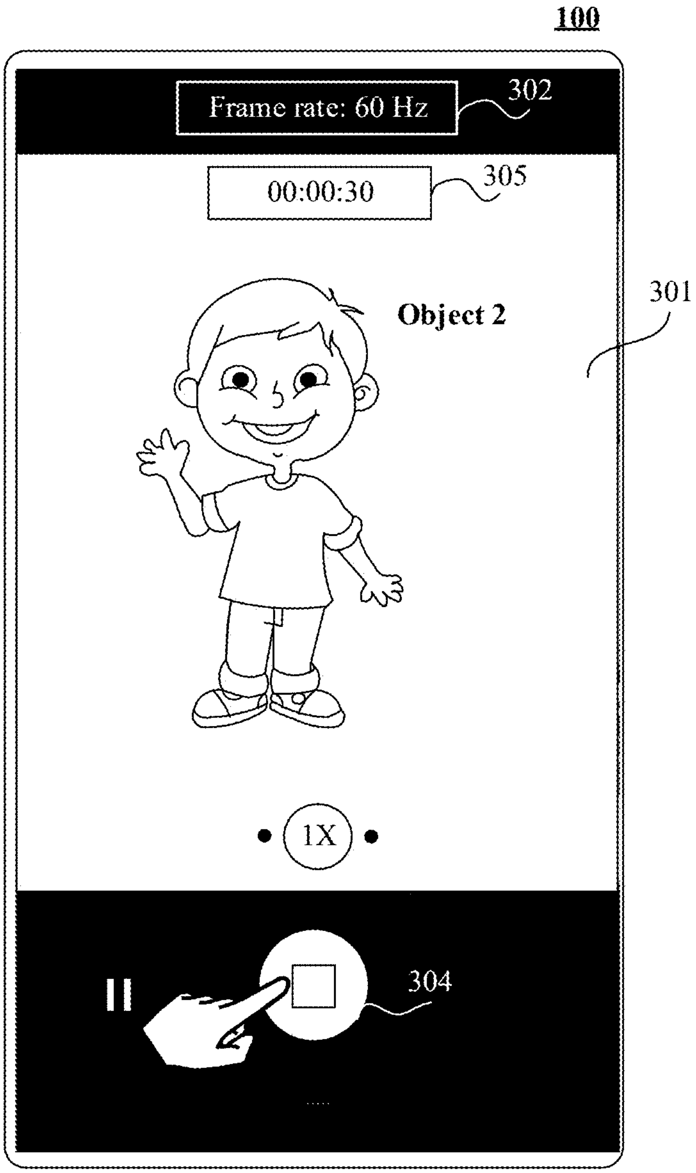

The video recording interface shown in FIG. 3K includes a recording time display box 305, a frame rate information box 302, and a recording stop control 304. From the recording time display box 305 and the frame rate information box 302, it can be seen that a recording time of a current video is 30 seconds, and the video frame rate is 60 Hz. An input operation (for example, tapping) performed on the recording stop control 304 is detected, and the electronic device 100 saves a current video file in response to this operation. The video file is a second video file, and a frame rate of the second video file is 60 Hz.

Figure 4:
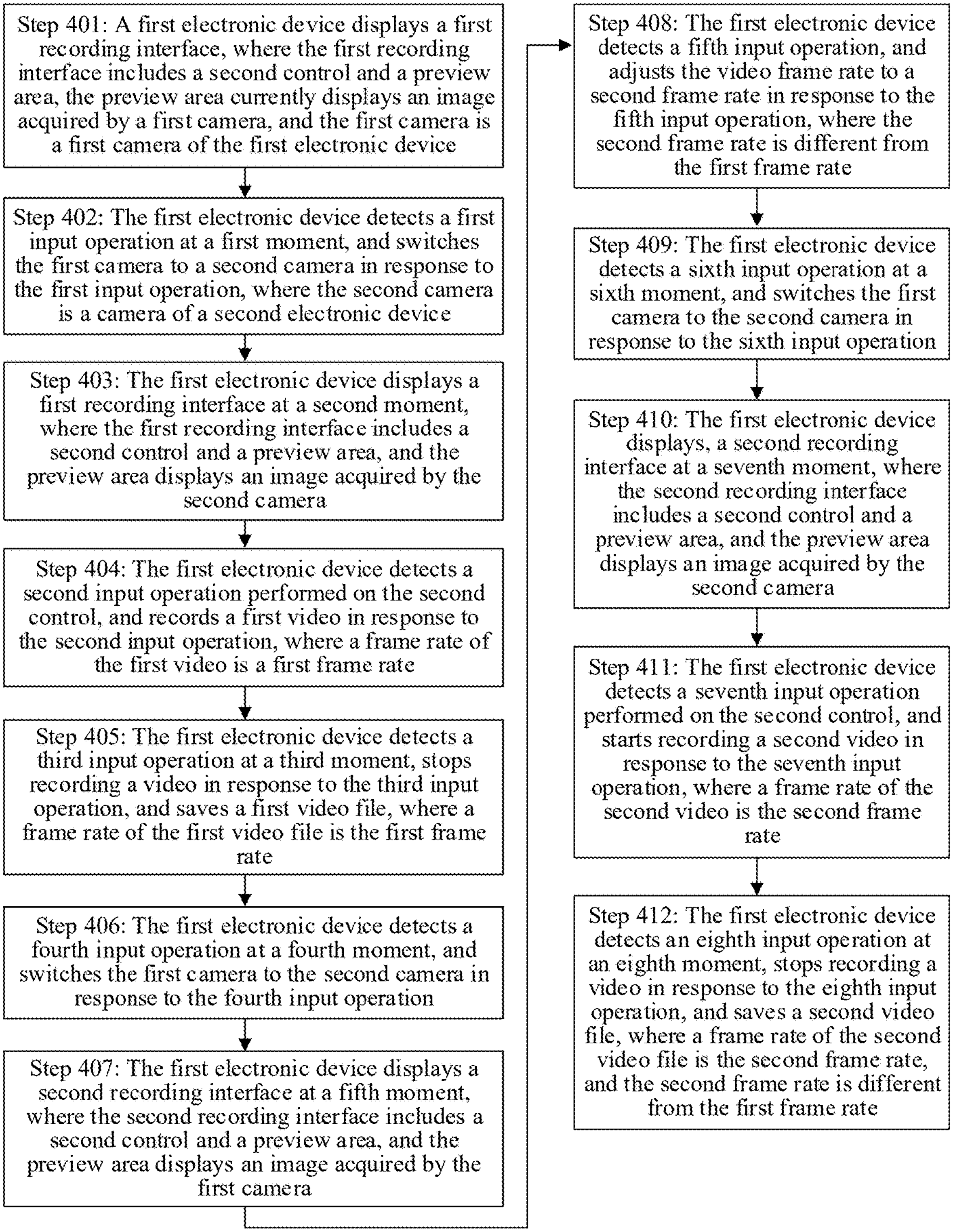
FIG. 4 is a flowchart of video recording according to an embodiment of this application.

Example description of the process of video recording by the first electronic device in the embodiments of FIG. 3A to FIG. 3K is provided below with reference to FIG. 4. For example, the first electronic device may be the electronic device 100 in the embodiments of FIG. 3A to FIG. 3K, and the second electronic device may be the electronic device 200 in FIG. 3A to FIG. 3K. A multi-screen collaboration connection has been established between the first electronic device and the second electronic device. FIG. 4 is a flowchart of video recording according to an embodiment of this application, with the specific process as follows.

Step 401: A first electronic device displays a first recording interface, where the first recording interface includes a second control and a preview area, the preview area currently displays an image acquired by a first camera, and the first camera is a first camera of the first electronic device.

For example, the first recording interface may be the preview interface in the embodiment of FIG. 3A, and the second control may be the recording start control 303 in the embodiment of FIG. 3A. In this case, a frame rate of video recording by the first electronic device is a first frame rate, and the first frame rate may be a default frame rate of the first electronic device (for example, 30 Hz).

Specifically, after starting a first application, the electronic device displays the first recording interface. The first application may be an application having a video recording function, such as a camera application and WeChat.

Step 402: The first electronic device detects a first input operation at a first moment, and switches the first camera to a second camera in response to the first input operation, where the second camera is a camera of a second electronic device.

For example, the first input operation may be the input operation performed on the preview interface and the input operation performed on the "Switch audio/video to the tablet" icon in the embodiments of FIG. 3A and FIG. 3B.

Step 403: The first electronic device displays a first recording interface at a second moment, where the first recording interface includes a second control and a preview area, and the preview area displays an image acquired by the second camera.

For example, the first recording interface may be the preview interface shown in FIG. 3C.

Step 404: The first electronic device detects a second input operation performed on the second control, and records a first video in response to the second input operation, where a frame rate of the first video is the first frame rate.

Specifically, the second control may be the input operation performed on the recording start control 303 in the embodiment of FIG. 3C.

Step 405: The first electronic device detects a third input operation at a third moment, and stops recording a video in response to the third input operation, and saves a first video file, where a frame rate of the first video file is the first frame rate.

For example, the third input operation may be the input operation performed on the recording stop control 304 in the embodiment of FIG. 3D.

Step 406: The first electronic device a fourth input operation at a fourth moment, and switches the first camera to the second camera in response to the fourth input operation.

For example, the fourth input operation may be the input operation (for example, sliding down from a top of the screen) performed on the preview interface and the input operation performed on the "Switch audio/video to the mobile phone" icon in the embodiments of FIG. 3E and FIG. 3F.

Step 407: The first electronic device displays a second recording interface at a fifth moment, where the second recording interface includes a second control and a preview area, and the preview area displays an image acquired by the first camera.

For example, the second recording interface may be the preview interface shown in FIG. 3G.

Step 408: The first electronic device detects a fifth input operation, and adjusts the video frame rate to a second frame rate in response to the fifth input operation, where the second frame rate is different from the first frame rate.

For example, the fifth input operation may be the input operation performed on the frame rate information box 302 in the embodiment of FIG. 3G.

Step 409: The first electronic device detects a sixth input operation at a sixth moment, and switches the first camera to the second camera in response to the sixth input operation.

For example, the sixth input operation may be the input operation performed on the preview interface and the input operation performed on the "Switch audio/video to the tablet" icon in FIG. 3H and FIG. 3I.

Step 410: The first electronic device displays a second recording interface at a seventh moment, where the second recording interface includes a second control and a preview area, and the preview area displays an image acquired by the second camera.

For example, the second recording interface may be the preview interface in the embodiment of FIG. 3J.

Step 411: The first electronic device detects a seventh input operation performed on the second control, and starts recording a second video in response to the seventh input operation, where a frame rate of the second video is the second frame rate.

For example, the seventh input operation may be the input operation performed on the recording start control in the embodiment of FIG. 3J.

Step 412: The first electronic device detects an eighth input operation at an eighth moment, stops recording a video in response to the eighth input operation, and saves a second video file where a frame rate of the second video file is the second frame rate, and the second frame rate is different from the first frame rate.

For example, the eighth input operation may be the detected input operation performed on the recording stop control 304 in FIG. 3K.

In the above embodiments of the scenario 1 and the scenario 2, a virtual camera is used to acquire an image, that is, the first electronic device switches the camera thereof (the first camera) to the camera (the second camera) of the second electronic device to acquire an image, thus implementing use of a camera of another electronic device. During use of the virtual camera by the first electronic device, the functional modules interact, so that the image acquired by the camera of the second electronic device can be transmitted to the first electronic device.

In the embodiment of FIG. 2, the process of interaction between the functional modules during the process of the first electronic device switching the camera of the second electronic device to acquire an image is described below with reference to FIG. 5A and FIG. 5B. The second electronic device is an electronic device that establishes a multi-screen collaboration connection to the first electronic device. For example, the first electronic device may be the electronic device 100 in the embodiment of FIG. 1A, and the second electronic device may be the electronic device 200 in the embodiment of FIG. 1A.

The first electronic device includes a camera service module (CameraServe), a physical camera module, a virtual camera module, and a first application. The camera service module is located at an application framework layer in an Android software architecture, and the physical camera module and the virtual camera module are located at a hardware abstraction layer (HAL) in the Android software architecture. The process of the first electronic device invoking the virtual camera to acquire an image is as follows.

Step 501: The camera service module sends a first configuration request to the physical camera module.

Specifically, the first electronic device starts the physical camera module before starting a camera, so that the physical camera module can configure relevant parameters.

Optionally, before the camera service module sends a first configuration message, the first electronic device may start the first application. The first application is an application having a function of invoking a camera to acquire an image, such as a camera application and WeChat. After the first application is started, a trigger instruction may be sent to the camera service module. The trigger instruction is used to trigger the camera service module to send the first configuration request to the physical camera module.

Step 502: The camera service module sends a first request message to the physical camera module.

Specifically, the first request message is used to indicate the physical camera module to invoke a first camera to acquire an image. The first camera is a camera of the first electronic device, and the first request message includes identification information.

The camera service module needs to send a request message before requesting for each image frame. The physical camera module/virtual camera module receives a corresponding request message before invoking the camera to acquire an image and returning the acquired image.

Optionally, before the camera service module sends the first request message to the physical camera module, the camera service module may send first indication information to the physical camera module. The first indication information may include identification information of the first camera, and the first indication information is used to indicate the physical camera module to use the first camera to acquire an image and upload the image acquired by the first camera.

Step 503: The physical camera module invokes the first camera to acquire a first image based on the first request message.

Step 504: The physical camera module sends a first data frame to the camera service module.

Specifically, the first data frame includes a first image and an image acquisition parameter.

Upon receiving a first request message every time, the physical camera module parses the first request message. If an image acquisition parameter is included in the first request message, the image acquisition parameter in the first request message received this time is added to the first data frame. If an image acquisition parameter is parsed from the first request message received this time, a stored image acquisition parameter in the previously received first request message is added to the first data frame. The image acquisition parameter may be Setting data, and the Setting data includes metadata such as a maximum frame rate, exposure compensation, and a coding scheme.

Step 505: The camera service module sends the first data frame to the first application.

Specifically, the camera service module may upload the first data frame received thereby to the first application, so that the first application may obtain the first image based on the first data frame and display the first image on the first interface.

For example, the first application may be the camera application corresponding to the camera icon in the embodiment of FIG. 1E, and the first interface may be the photographing interface in the embodiment of FIG. 1F.

Optionally, the camera service module may further store the received first data frame in a buffer (Buffer). The Buffer is configured to temporarily store data frames received by the camera service module, and each data frame includes an image acquired by a camera. Due to limited space of the Buffer, the Buffer uses a first-in first-out method to store data frames, that is, when a quantity of data frames stored in the Buffer is greater than or equal to an upper limit value N of data frames stored in the Buffer, the Buffer clears previously stored data frames to reserve storage space for storing new data frames.

For example, it is assumed that the upper limit value of data frames that the Buffer can store is 4, a data frame 1, a data frame 2, a data frame 3, and a data frame 4 have been stored in the current Buffer in chronological order. When the camera service module receives a data frame 5 sent by the physical camera module, the camera service module needs to clear the data frame 1 from the Buffer before storing the data frame 5 in the Buffer.

Step 506: The first application obtains the first image based on the first data frame and displays the first image on the first interface.

Step 507: A first input operation is detected at a first moment, and the first application sends a first switching instruction to the camera service module.

Step 508: The camera service module sends second indication information to the physical camera module.

Specifically, the second indication information is used to indicate the physical camera module to send the request message sent by the camera service module to the virtual camera module.

Step 509: The camera service module sends a second request message to the physical camera module, and the second request message is used to indicate the virtual camera module to invoke a second camera to acquire a second image.

Specifically, the second request message is used to indicate the virtual camera module to invoke the second camera to acquire the second image. The second request message includes identification information of the second request message, and may also include identification information of the second camera. The second camera is a camera of the second electronic device.

Optionally, the physical camera module may detect whether the virtual camera module is in a working state after receiving the second request message. If the virtual camera module is in no working state, the camera service module may use the first camera to acquire an image based on the second request message and return a corresponding data frame to the camera service module. The second request message sent by the camera service module is sent to the virtual camera module when it is detected next time that the virtual camera module is in a working state. In this way, when the first electronic device switches the first camera to the camera of the second electronic device for the first time, the camera can be effectively prevented from being switched during starting of the virtual camera module, which otherwise results in that no camera acquires an image, thus causing an image to be interrupted in the first interface of the first electronic device.

Step 510: The physical camera module sends the second request message to the virtual camera module.

Step 511: The virtual camera module invokes the second camera to acquire the second image based on the second request message.

Specifically, after receiving the second request message sent by the physical camera module, the virtual camera module invokes the second camera to acquire the second image.

Step 512: The virtual camera module sends a second data frame to the camera service module.

Specifically, the second data frame includes a second image frame acquired by the second camera and the identification information of the second request message.

Optionally, after receiving the second request message sent by the physical camera module, the virtual camera module may parse the second request message. If an image acquisition parameter is included in the second request message, the image acquisition parameter in the second request message received this time is added to the second data frame, and the image acquisition parameter is saved. If no image acquisition parameter is parsed from the second request message received this time, a stored image acquisition parameter in the previously received second request message is added to the second data frame. If no image acquisition parameter is stored in the virtual camera module, no image acquisition parameter is added in the second data frame.

Step 513: The camera service module sends the second data frame to the first application.

Specifically, the camera service module may upload the second data frame received thereby to the first application, so that the first application may obtain the second image based on the second data frame and display the second image on the first interface.

Optionally, the camera service module may further store the received first data frame in a buffer (Buffer).

Step 514: A second input operation is detected at a second moment, and the first application sends a second switching instruction to the camera service module.

Specifically, the second switching instruction is used to indicate the image-acquiring second camera of the camera service module to be switched to a third camera of the second electronic device. Optionally, identification information of the third camera may be included in the second switching instruction.

For example, the second input operation may be the input operation performed on the "Switch audio/video to the tablet" icon in the embodiments of FIG. 1G.

Step 515: The camera service module sends third indication information to the physical camera module.

Specifically, the third indication information is used to indicate the physical camera module to send the request message sent by the camera service module to the virtual camera module.

Step 516: The camera service module sends a third request message to the physical camera module, and the third request message is used to indicate the virtual camera module to invoke the third camera to acquire a third image.

Specifically, the third request message is used to indicate the virtual camera module to invoke the third camera to acquire the third image. The third request message includes identification information of the third request message, and may also include identification information of the third camera. The third camera is a camera of the second electronic device.

Step 517: The physical camera module sends the third request message to the virtual camera module.

Step 518: The virtual camera module invokes the third camera to acquire the third image based on the third request message.

Specifically, after receiving the third request message sent by the physical camera module, the virtual camera module invokes the third camera to start acquiring the third image. The third camera is a camera of the second electronic device.

Step 519: The virtual camera module sends a third data frame to the camera service module.

Specifically, the third data frame includes a third image frame acquired by the third camera and the identification information of the third request message.

Optionally, after receiving the third request message sent by the physical camera module, the virtual camera module may parse the third request message. If an image acquisition parameter is included in the third request message, the image acquisition parameter in the third request message received this time is added to the third data frame, and the image acquisition parameter is saved. If no image acquisition parameter is parsed from the third request message received this time, a stored image acquisition parameter in the previously received third request message is added to the third data frame. If no image acquisition parameter is stored in the virtual camera module, no image acquisition parameter is added in the third data frame.

Step 520: The camera service module sends the third data frame to the first application.

Specifically, the camera service module may upload the third data frame received thereby to the first application, so that the first application may obtain the third image based on the third data frame and display the third image on the first interface.

Optionally, the camera service module may further store the received first data frame in a buffer (Buffer).

Figure 5A:
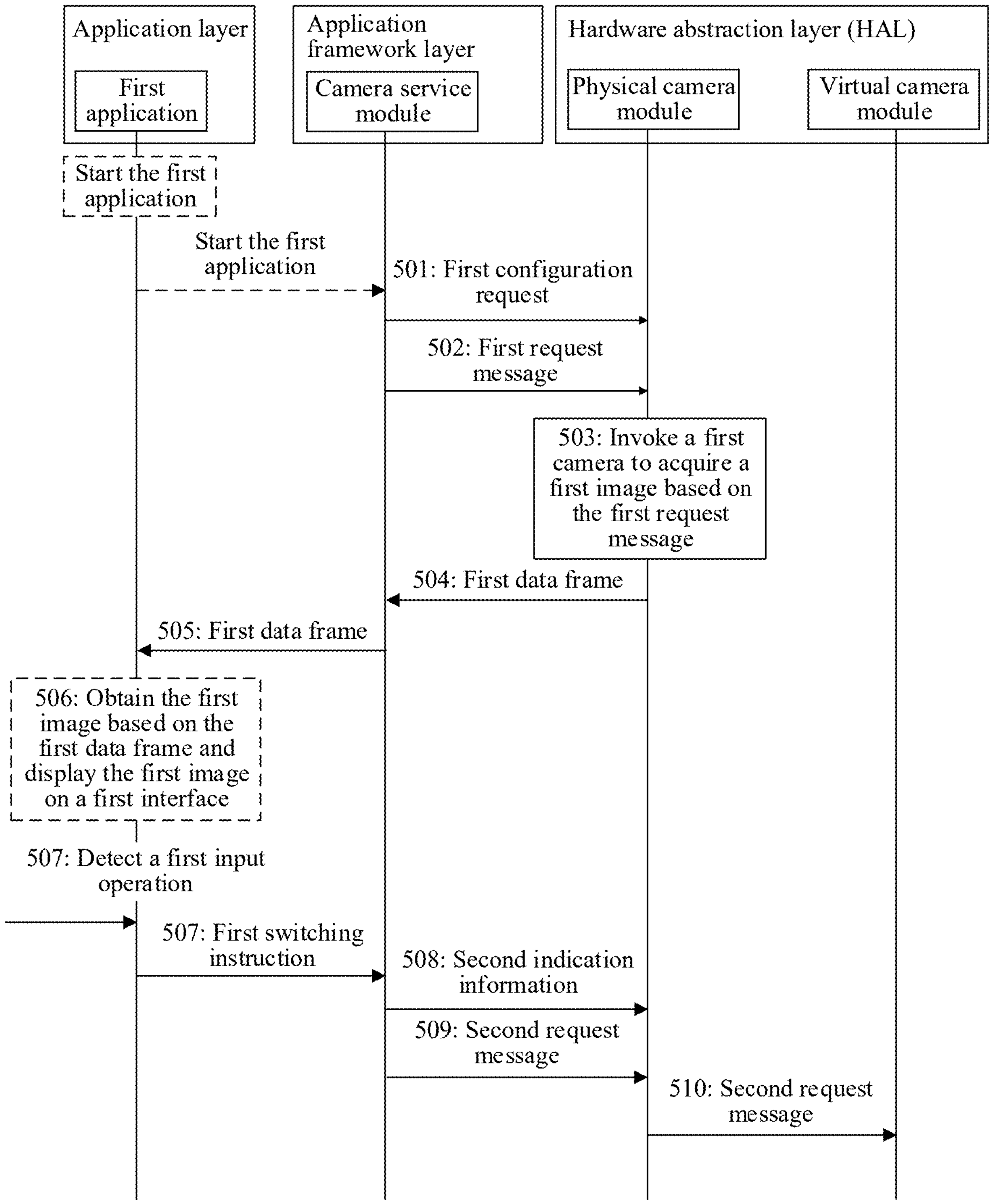
FIG. 5A and FIG. 5B are flowcharts of another camera switching method according to an embodiment of this application.
Figure 5B:
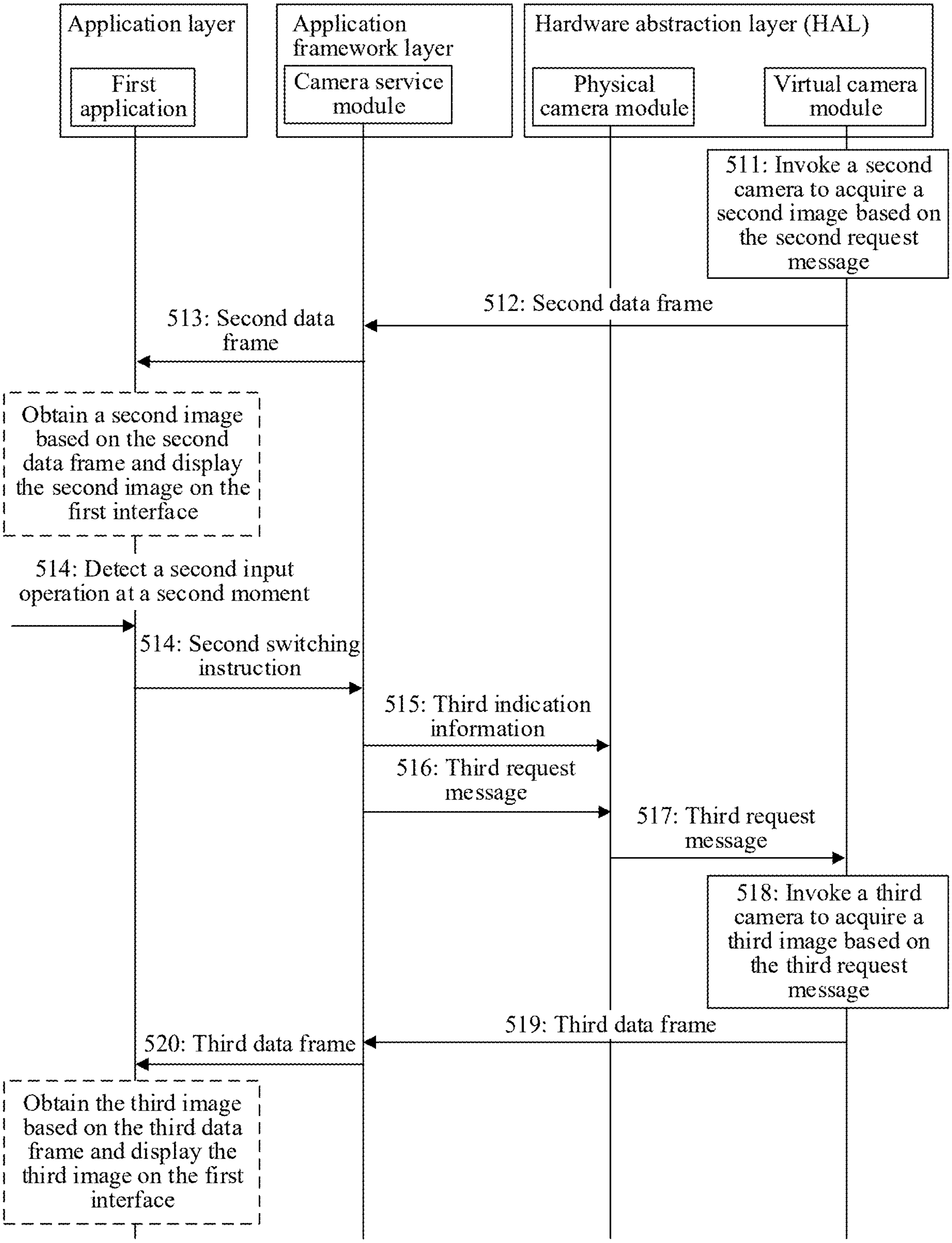

The embodiments of FIG. 5A and FIG. 5B describe the process of interaction between modules during switching of the virtual camera by the first electronic device in image acquisition. When the first electronic device starts the camera to acquire an image, a request message corresponding to a first image frame sent by the camera service module to the physical camera module includes an image acquisition parameter. Upon receiving a request message every time, the physical camera module may parse an image parsing parameter in the request message and store the image parsing parameter. Before returning a data frame to the camera service module, the physical camera module may add a latest image acquisition parameter stored thereby to the data frame and return the data frame. Similarly, when receiving a request message sent by the camera service module, the virtual camera module may also parse image acquisition parameters in the request message and store the image acquisition parameters, so as to add the image acquisition parameter to a data frame before returning the data frame to the camera service module to ensure integrity of the returned data frame. The image acquisition parameter may be Setting (setting) data, and the Setting (setting) data includes metadata such as a maximum frame rate, exposure compensation data, and a coding scheme. After receiving a Setting parameter, the physical camera module may acquire an image based on metadata in the Setting parameter. For example, the physical camera module may acquire an image based on the maximum frame rate in Setting, may perform exposure compensation on the acquired image based on the exposure compensation data in the Setting, and may encode the acquired image based on the coding scheme in the Setting.

In some embodiments, the camera service module adds an image acquisition parameter only in a request message corresponding to a first image frame. When receiving the request message corresponding to the first image frame that is sent by the camera service module, the physical camera module stores the image acquisition parameter in the request message. In this case, no image acquisition parameter is stored in the virtual camera module, and no image acquisition parameter is included in request messages subsequently sent by the camera service module. As a result, the virtual camera module subsequently has no image acquisition parameter. Therefore, when the camera is switched to the second camera or the third camera of the second electronic device, and when no image acquisition parameter is included in the request messages sent by the camera service module, data frames returned by the virtual camera module include no image acquisition parameter. As a result, the data frames returned by the virtual camera module are incomplete data frames.

Before the first electronic device switches the second camera for image acquisition to the third camera, the camera service module may check integrity of data frames cached in the buffer. If the camera service module detects that there is an incomplete data frame (data frame without an image acquisition parameter) in the buffer, the camera service module may pause camera switching during first duration to wait for the virtual camera module to upload a complete data frame during the first duration. The camera service module may pause camera switching in the following manner: sending no camera switching indication information to the physical camera module within the first duration, or sending no request message within the first duration. After the first duration, the camera service module switches a camera regardless of whether the virtual camera module sends a complete data frame. The first duration may be determined based on a quantity of incomplete data frames in the buffer. A larger quantity of incomplete data frames indicates longer first duration (for example, the first duration is generally 5-15 seconds).

In this case, when the first electronic device switches a virtual camera (for example, the second camera in the embodiments of FIG. 5A to FIG. 5B) to another camera, a long delay occurs, causing a user to be unable to switch the camera quickly, thereby lowering user experience. That is, in the embodiment of FIG. 2, a difference between the fourth moment and the third moment is greater than or equal to the first duration.

Therefore, in view of the above problems, an embodiment of this application provides another camera switching method. The method includes the following steps. Each time a physical camera module receives a request message sent by a camera service module, the physical camera module parses whether an image acquisition parameter exists in the request message. If yes, the physical camera module stores the image acquisition parameter in a virtual camera module. In this way, when the virtual camera module returns a data frame, and when no image acquisition parameter exists in the request message received by the virtual camera module, the virtual camera module may add an image acquisition parameter stored thereby to the data frame, so as to ensure integrity of the returned data frame, thereby reducing the delay time of switching the virtual camera to another camera by the first electronic device.

Figure 6A:
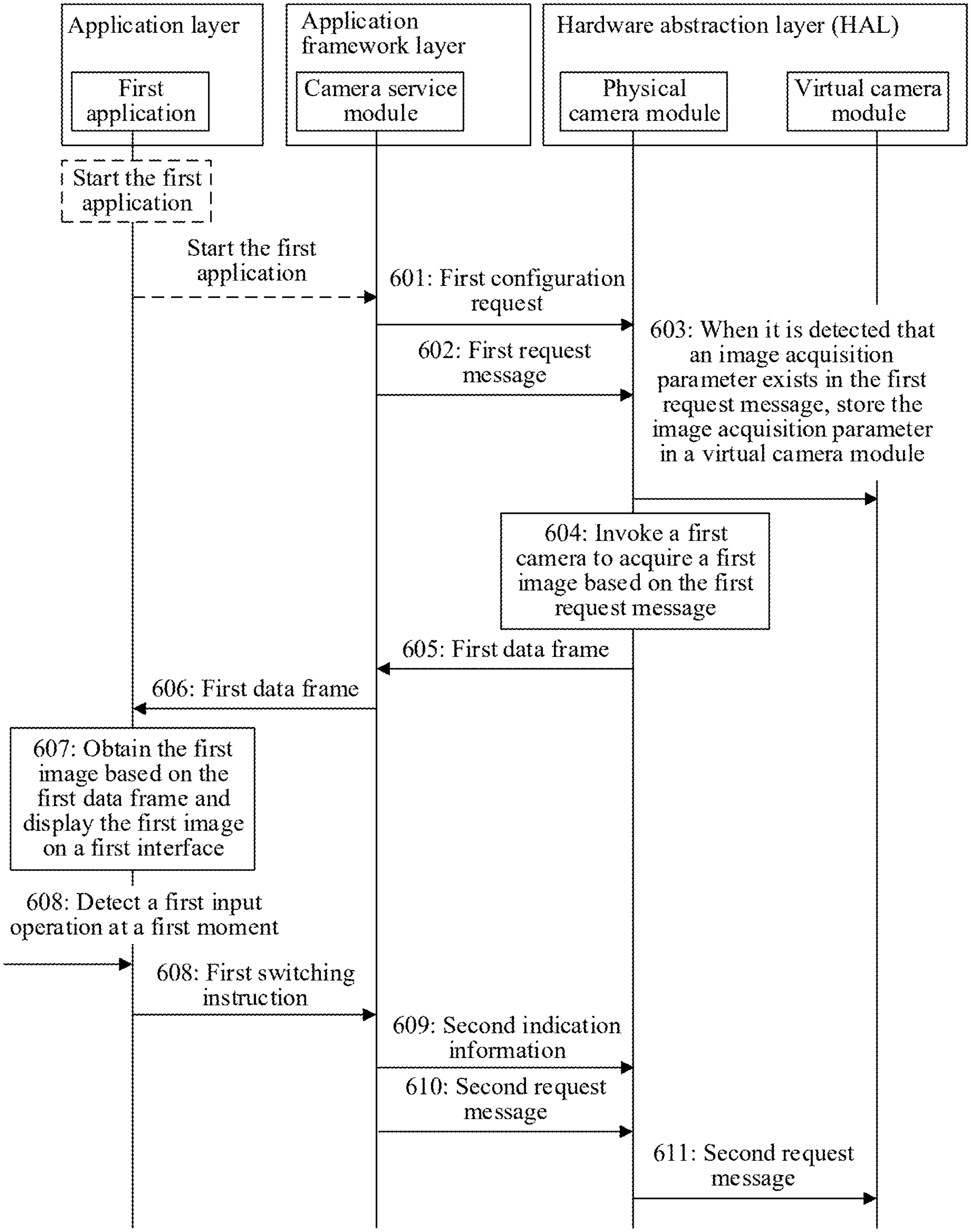
FIG. 6A and FIG. 6B are flowcharts of still another camera switching method according to an embodiment of this application.
Figure 6B:
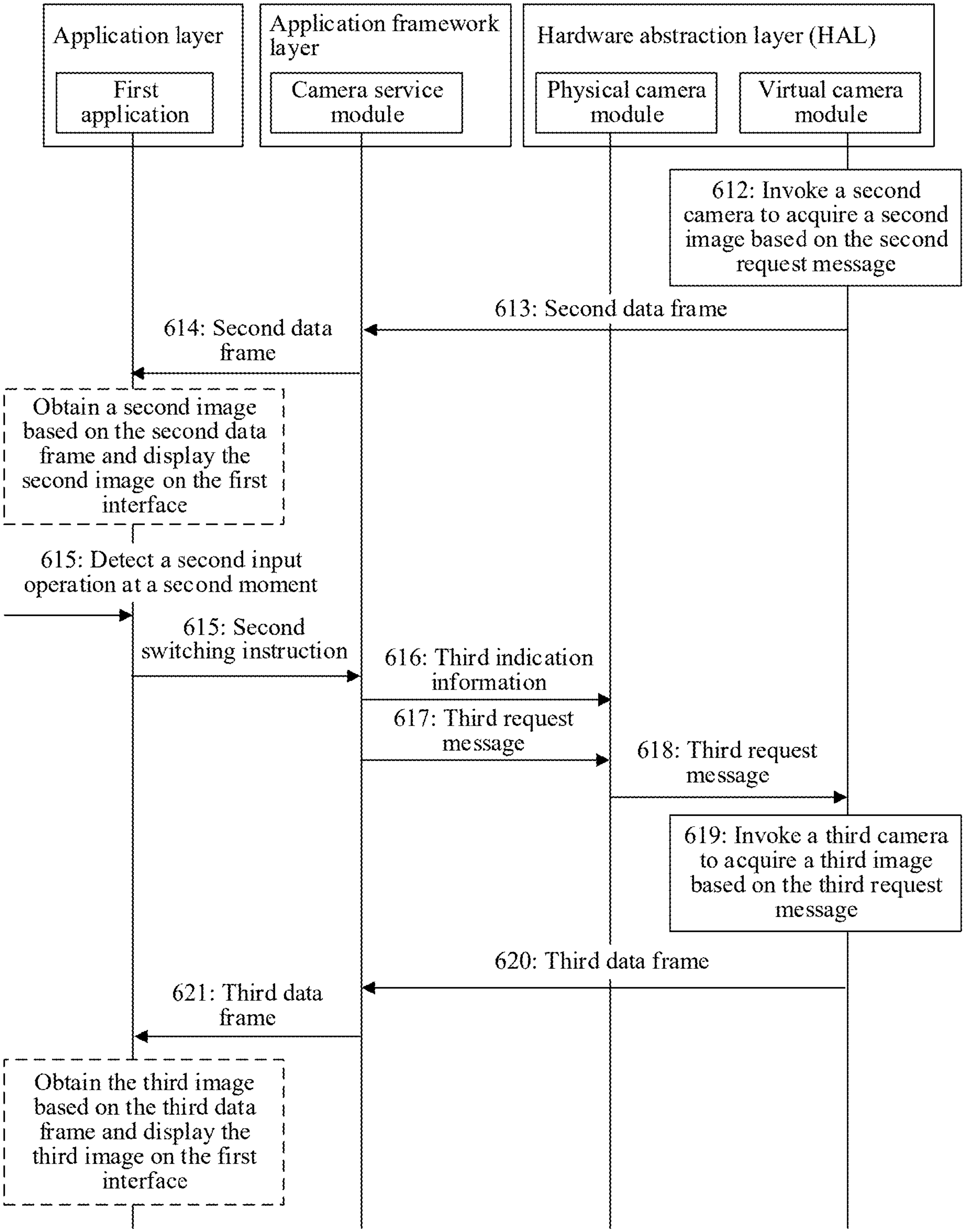

The process of the above method is described below with reference to FIG. 6A and FIG. 6B. FIG. 6A and FIG. 6B are flowcharts of still another camera switching method according to an embodiment of this application, with a specific process as follows.

Step 601: A camera service module sends a first configuration request to a physical camera module.

Step 602: The camera service module sends a first request message to the physical camera module.

For steps 601 and 602, reference may be made to steps 501 and 502 in the embodiment of FIG. 5A. Details are not described herein.

Step 603: When detecting that an image acquisition parameter exists in the first request message, the physical camera module stores the image acquisition parameter in a virtual camera module.

Specifically, after receiving the first request message, the physical camera module may parse the first request message to determine whether an image acquisition parameter exists in the first request message. If yes, the physical camera module stores the image acquisition parameter in the virtual camera module. In this way, when a camera for image acquisition is switched from a camera of a first electronic device to a camera of a second electronic device, if no image acquisition parameter exists in a request message received by the virtual camera module, the virtual camera module may add an image acquisition parameter stored by the physical camera module therefor to a data frame to ensure integrity of the returned data frame. In this way, when the first electronic device switches a camera for image acquisition from the camera of the second electronic device to another camera, the delay time of camera switching can be reduced, and user experience can be improved.

In some embodiments, when an image acquisition parameter is included in the first request message received by the physical camera module and the virtual camera module is in no working state, if an image acquisition parameter already exists in the virtual camera module, the physical camera module may replace the image acquisition parameter in the virtual camera module with the image acquisition parameter in the first request message currently received by the physical camera module.

Step 604: The physical camera module invokes a first camera to acquire a first image based on the first request message.

Step 605: The physical camera module sends a first data frame to the camera service module.

Step 606: The camera service module sends the first data frame to a first application.

Step 607: The first application obtains the first image based on the first data frame and displays the first image on a first interface.

Step 608: A first input operation is detected at a first moment, and the first application sends a first switching instruction to the camera service module.

Step 609: The camera service module sends second indication information to the physical camera module.

Step 610: The camera service module sends a second request message to the physical camera module, and the second request message is used to indicate the virtual camera module to invoke a second camera to acquire a second image.

For steps 604 and 610, reference may be made to steps 503 and 509 in the embodiment of FIG. 5A. Details are not described herein.

Step 611: The physical camera module sends the second request message to the virtual camera module.

Specifically, after receiving the second request message, the virtual camera module parses the second request message to determine whether an image acquisition parameter exists in the second request message. If yes, the virtual camera module updates the image acquisition parameter stored thereby to the image acquisition parameter in the second request message.

Step 612: The virtual camera module invokes the second camera to acquire the second image based on the second request message.

Step 613: The virtual camera module sends a second data frame to the camera service module.

Specifically, the second data frame includes a second image frame acquired by the second camera, identification information of the second request message, and an image acquisition parameter.

Step 614: The camera service module sends the second data frame to the first application.

Step 615: A second input operation is detected at a second moment, and the first application sends a second switching instruction to the camera service module.

Step 616: The camera service module sends third indication information to the physical camera module.

For steps 614 to 616, reference may be made to steps 513 and 514 in the embodiment of FIG. 5B. Details are not described herein.

Step 617: The camera service module sends a third request message to the physical camera module, and the third request message is used to indicate the virtual camera module to invoke a third camera to acquire a third image.

Specifically, the third request message is used to indicate the virtual camera module to invoke the third camera to acquire the third image. The third request message includes identification information of the third request message, and may also include identification information of the third camera. The third camera is a camera of the second electronic device.

Step 618: The physical camera module sends the third request message to the virtual camera module.

Specifically, after receiving the third request message, the virtual camera module parses the third request message to determine whether an image acquisition parameter exists in the third request message. If yes, the virtual camera module updates the image acquisition parameter stored thereby to the image acquisition parameter in the third request message.

Step 619: The virtual camera module invokes the third camera to acquire the third image based on the third request message.

Step 620: The virtual camera module sends a third data frame to the camera service module.

Specifically, the third data frame includes a third image frame acquired by the third camera, identification information of the third request message, and an image acquisition parameter.

Step 621: The camera service module sends the third data frame to the first application.

Specifically, the camera service module may upload the third data frame received thereby to the first application, so that the first application may obtain the third image based on the third data frame and display the third image on the first interface.

In the embodiments of FIG. 6A and FIG. 6B, when the first electronic device starts the camera to acquire an image, after receiving a request message sent by the camera service module and obtaining an image acquisition parameter in the request message, the physical camera module stores the image acquisition parameter in the virtual camera module, so that the image acquisition parameter is stored in the virtual camera module. In this way, even if no image acquisition parameter exists in the request message subsequently sent by the camera service module, the virtual camera module may add image acquisition information stored by the physical camera module therefor to a data frame when invoking the camera of the second electronic device to acquire an image, so as to ensure integrity of the data frame returned thereby. The problem that the camera switching time is long and user experience is lowered due to an incomplete data frame previously returned by the virtual camera module during switching of the camera of the second electronic device to another camera by the first electronic device is solved.

Figure 7:
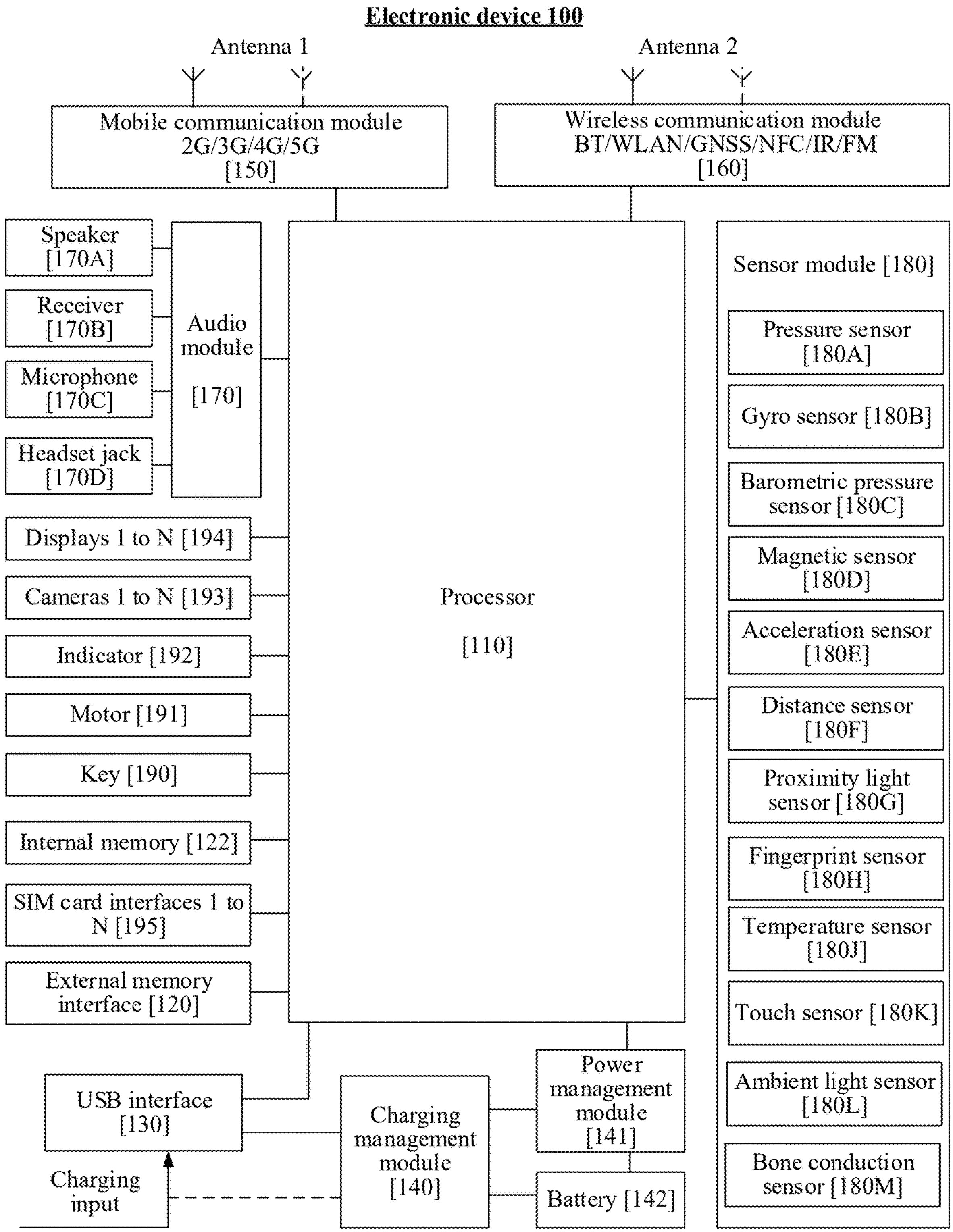
FIG. 7 is a schematic diagram of a hardware structure of an electronic device 100 according to an embodiment of this application.

The structure of the electronic device 100 is described below. FIG. 7 is a schematic diagram of a hardware structure of an electronic device 100 according to an embodiment of this application.

The electronic device 100 may include a processor 110, an external memory interface 120, an internal memory 122, a universal serial bus (universal serial bus, USB) interface 130, a charge management module 140, a power management module 141, a battery 142, an antenna 1, an antenna 2, a mobile communication module 150, a wireless communication module 160, an audio module 170, a speaker 170A, a receiver 170B, a microphone 170C, a headphone jack 170D, a sensor module 180, a key 190, a motor 191, an indicator 192, a camera 193, a display 194, and a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It may be understood that the structure illustrated in the embodiments of the present invention does not constitute a specific limitation on the electronic device 100. In some other embodiments of this application, the electronic device 100 may include more or fewer components than those shown in FIG. 7, or combine some components, or split some components, or have different component arrangements. The components shown in FIG. 7 may be implemented by using hardware, software or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video encoder and decoder, a digital signal processor (digital signal processor, DSP), a baseband processor, and/or a neural-network processing unit (neural-network processing unit, NPU), and the like. Different processing units may be separate devices, or may be integrated into one or more processors.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed to improve utilization of the antennas. For example, the antenna 1 may be multiplexed as a diversity antenna of a wireless local area network. In some other embodiments, the antenna may be used in combination with a tuning switch.

The mobile communication module 150 may provide a solution to wireless communication such as 2G/3G/4G/5G applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering and amplification on the received electromagnetic wave, and transmit the electromagnetic wave to the modem processor for demodulation. The mobile communication module 150 may further amplify a signal modulated by the modem processor, and convert, by using the antenna 1, the signal into an electromagnetic wave for radiation. In some embodiments, at least some functional modules of the mobile communication module 150 may be disposed in the processor 110. In some embodiments, at least some functional modules of the mobile communication module 150 may be disposed in a same device as at least some modules of the processor 110.

The wireless communication module 160 may provide wireless communication solutions applicable to the electronic device 100, including a wireless local area network (wireless local area networks, WLAN) (for example, a Wi-Fi network), Bluetooth (BlueTooth, BT), BLE broadcast, a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more devices integrating at least one communication processing module. The wireless communication module 160 receives electromagnetic waves by using the antenna 2, performs frequency modulation and filtering on an electromagnetic wave signal, and sends a processed signal to the processor 110. The wireless communication module 160 may further receive a to-be-sent signal from the processor 110, perform frequency modulation and amplification on the signal, and convert, by using the antenna 2, the signal into electromagnetic waves for radiation.

The electronic device 100 implements a display function by using the GPU, the display 194, the application processor, and the like. The GPU is a microprocessor for image processing and connects the display 194 to the application processor. The GPU is configured to perform mathematical and geometric calculation for graphics rendering. The processor 110 may include one or more GPUs, and the one or more GPUs execute program instructions to generate or change displayed information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, a quantum dot light emitting diode (quantum dot light emitting diodes, QLED), and the like. In some embodiments, the electronic device 100 may include 1 or N displays 194, where N is a positive integer greater than 1.

The electronic device 100 may implement a photographing function by using the ISP, the camera 193, the video encoder and decoder, the GPU, the display 194, the application processor, and the like.

The ISP is configured to handle data returned by the camera 193. For example, during photographing, a shutter is open, and light is transmitted to a photosensitive element of the camera through a lens. An optical signal is converted into an electrical signal. The photosensitive element of the camera transfers the electrical signal to the ISP for processing, so that the electrical signal is converted into an image visible to naked eyes. The ISP may further perform algorithm optimization on noise and brightness of the image. The ISP may further optimize parameters such as exposure and a color temperature of a photographing scenario. In some embodiments, the ISP may be disposed in the camera 193.

The digital signal processor is configured to process a digital signal, and in addition to a digital image signal, the digital signal processor may process another digital signal. For example, when the electronic device 100 selects a frequency, the digital signal processor is configured to perform Fourier transform and the like on frequency energy.

The NPU as a neural-network (neural-network, NN) computational processor quickly processes input information by learning from a structure of a biological neural network, for example, a transmission mode between neurons in human brain, and may further perform self-learning continuously. Applications such as intelligent cognition of the electronic device 100, for example, image recognition, face recognition, voice recognition, and text understanding, may be implemented by using the NPU.

The electronic device 100 may implement an audio function by using the audio module 170, the speaker 170A, the receiver 170B, the microphone 170C, the headset jack 170D, the application processor, and the like, such as music playing and recording.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some functional modules of the audio module 170 are disposed in the processor 110.

The speaker 170A, also referred to as "horn", is configured to convert an electrical audio signal into a sound signal. The electronic device 100 may be configured to listen to music or answer a call in a hands-free manner by using the speaker 170A.

The receiver 170B, also referred to as "handset", is configured to convert an electrical audio signal into a sound signal. When the electronic device 100 is configured to answer a call or receive voice information, the receiver 170B may be put close to a human ear to receive a voice.

The microphone 170C, also referred to as a "mic" or "mike", is configured to convert a sound signal into an electrical signal. When making a call or sending a voice message, a user may make a sound by approaching the mouth to the microphone 170C, to input a sound signal to the microphone 170C. The electronic device 100 may be provided with at least one microphone 170C. In some other embodiments, the electronic device 100 may be provided with two microphones 170C, which can implement a noise reduction function in addition to acquiring a sound signal. In some other embodiments, the electronic device 100 may alternatively be provided with three, four, or more microphones 170C, to acquire a sound signal, reduce noise, further identify a sound source, implement a directional recording function, and the like.

The pressure sensor 180A is configured to sense a pressure signal, and can convert the pressure signal into an electrical signal. In some embodiments, the pressure sensor 180A may be arranged at the display 194.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D may include a Hall sensor. The electronic device 100 may detect opening and closing of a flip leather cover by using the magnetic sensor 180D.

The acceleration sensor 180E may detect accelerations of the electronic device 100 in all directions (usually in three axes), may detect a magnitude and a direction of gravity when the electronic device 100 is stationary, and may be further configured to recognize an attitude of the electronic device, and is applicable to applications such as switching between a horizontal screen and a vertical screen and a pedometer.

The fingerprint sensor 180H is configured to collect a fingerprint. The electronic device 100 may use collected fingerprint features to perform unlocking by using the fingerprint, access an application lock, perform photographing by using the fingerprint, answer a call by using the fingerprint, and the like.

The touch sensor 180K is also referred to as a "touch panel". The touch sensor 180K may be disposed at the display 194. The touch sensor 180K and the display 194 form a touchscreen, also referred to as a "touch control screen". The touch sensor 180K is configured to detect a touch operation performed on or near the touch sensor 180K. The touch sensor may transmit the detected touch operation to the application processor to determine a touch event type. A visual output associated with the touch operation may be provided by using the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part.

In the embodiments of this application, a software system of the electronic device 100 may use a layered architecture, an event-driven architecture, a micro core architecture, a micro service architecture, or a cloud architecture. In the embodiments of this application, example description of a software architecture of the electronic device 100 is provided with an Android system with a layered architecture as an example.

Figure 8:
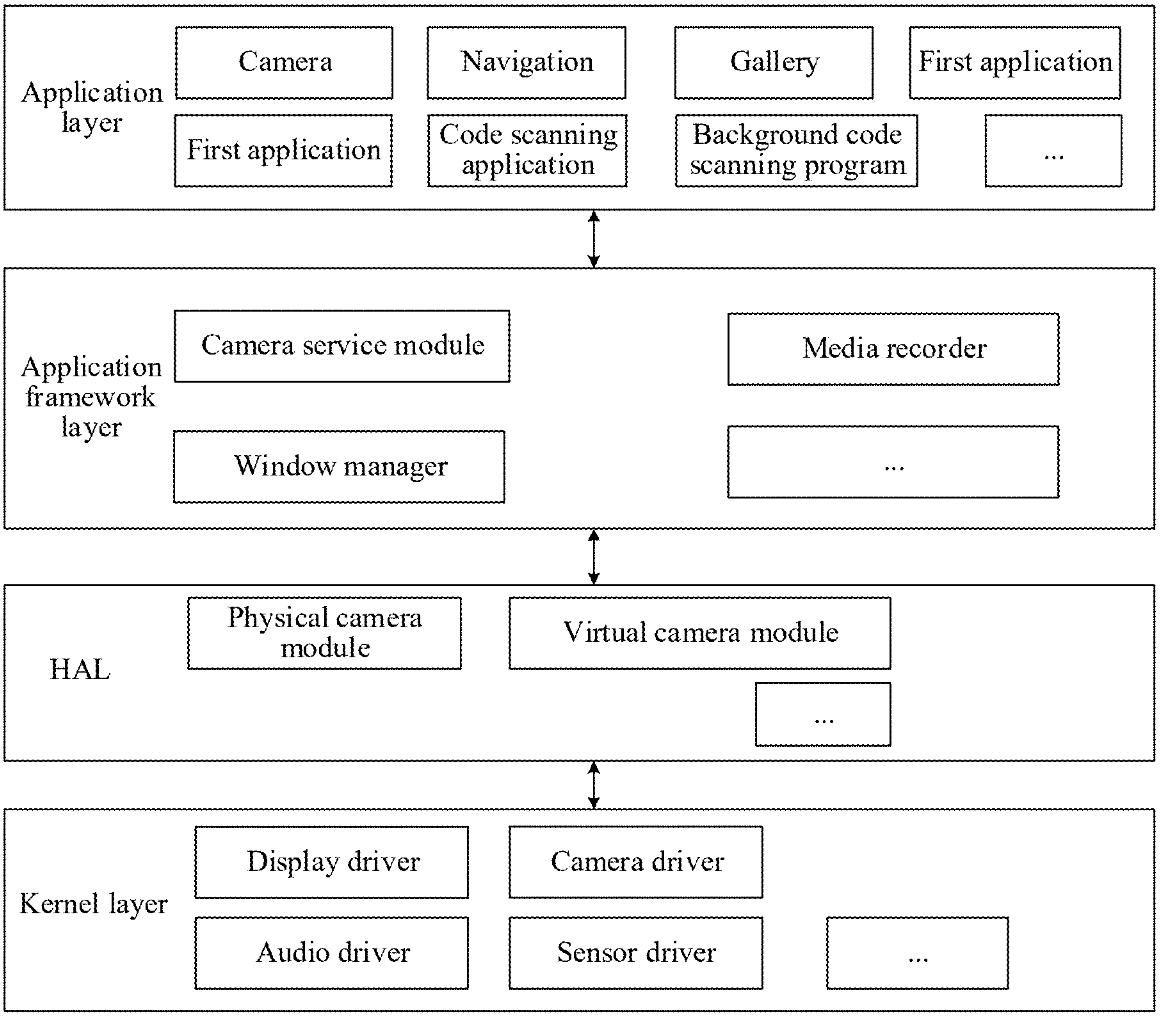
FIG. 8 is a schematic diagram of a software architecture of an electronic device 100 according to an embodiment of this application.

As shown in FIG. 8, the electronic device may include: an application layer, an application framework, a hardware abstraction layer (hardware abstraction layer, HAL), and a kernel (kernel) layer.

The application layer may include a series of application packages. As shown in FIG. 8, the application packages may include applications such as a camera application, a gallery, a first application, navigation, a code scanning application, and a background code scanning program.

The application framework layer provides an application programming interface (application programming interface, API) and a programming framework for applications at the application layer.

The application framework layer includes some predefined functions. As shown in FIG. 8, the application framework layer may include a window manager, a media recorder, a camera service module, and the like.

The window manager is configured to manage a window program. The window manager may obtain a display size, determine whether the display has a status bar, lock the screen, take a screenshot, and the like.

The camera service module is configured to send a request message to a physical camera module or a virtual camera module to request the physical camera module or the virtual camera module to invoke a camera to acquire an image and return the image.

The hardware abstraction layer may include a plurality of functional modules, such as a physical camera module and a virtual camera module.

The physical camera module is configured to invoke a camera of the electronic device 100 to acquire an image and return the acquired image to the camera service module, and in addition, store an image acquisition parameter in the virtual camera module.

The virtual camera module is configured to invoke a virtual camera to acquire an image and return the acquired image to the camera service module.

It should be noted that for brevity, the foregoing method embodiments are represented as a series of actions. However, a person skilled in the art should be aware that the present invention is not limited to the order of the described actions. A person skilled in the art should also be aware that the embodiments described in the specification are preferred embodiments, and that the actions involved are not necessarily required for the present invention.

The implementations of this application may be arbitrarily combined to achieve different technical effects.

The foregoing embodiments may be implemented in whole or in part by using software, hardware, firmware or any combination thereof. When being implemented by using software, all or some of the embodiments may be implemented in the form of a computer program product. The computer program product includes one or more computer instructions. When the computer program instructions are loaded and executed on a computer, all or some of the processes or functions according to this application are generated. The computer may be a general-purpose computer, a special-purpose computer, a computer network, or another programmable apparatus. The computer instructions may be stored in a computer-readable storage medium, or transmitted from one computer-readable storage medium to another computer-readable storage medium. For example, the computer instructions may be transmitted from one website site, computer, server or data center to another website, computer, server or data center in a wired (for example, a coaxial cable, an optical fiber, or a digital subscriber line) or wireless (for example, infrared, radio, or microwave) manner. The computer-readable storage medium may be any available medium that can be accessed by a computer or a data storage device such as a server or a data center that includes one or an integration of more available media. The available medium may be a magnetic medium (for example, a floppy disk, a hard disk, or a magnetic tape), an optical medium (for example, a DVD), a semiconductor medium (for example, a solid-state drive (Solid State Disk)), or the like.

A person of ordinary skill in the art may understand that all or some processes in implementing the method of the foregoing embodiment may be completed by using a computer program to instruct related hardware. The program may be stored in a computer-readable storage medium. The program, when executed, may include processes of the method embodiments described above. The foregoing storage medium includes: Various media that can store program code, such as an ROM, a random access memory (RAM), a magnetic disk, or an optical disc.

In conclusion, the foregoing descriptions are only embodiments of the technical solutions of the present invention, and are not intended to limit the protection scope of the present invention. Any modification, equivalent replacement, improvement, and the like made based on the disclosure of the present invention shall fall within the protection scope of the present invention.

The invention claimed is:

1. A camera switching method applied to a first electronic device, comprising:

displaying, by the first electronic device, a first interface, wherein the first interface comprises a preview area and a switching control, the preview area displays a first image, the first image is an image acquired by a first camera, the first camera is a camera of the first electronic device, and the first image is acquired by the first camera based on a parameter value of an image acquisition parameter;

switching, by the first electronic device, a camera for image acquisition to a second camera at a first moment in response to a first input operation, wherein the second camera is a camera of a second electronic device;

displaying, by the first electronic device, a second image th in the preview area at a second moment, wherein the second image is an image acquired by the second camera, and during image acquisition by the second camera, a data frame cached in a buffer carries the image acquisition parameter;

responding to a second input operation performed on the switching control at a third moment; and displaying, by the first electronic device, a third image that in the preview area at a fourth moment, wherein the third image is an image acquired by a third camera, and the third camera is a camera of the second electronic device;

wherein the first electronic device comprises a first application, a camera service module, a physical camera module, and a virtual camera module, and before the displaying, by the first electronic device, a first interface, the method further comprises:

detecting a third input operation, and starting the first application, sending, by the camera service module, a first request message to the physical camera module, when it is detected that an image acquisition parameter exists in the first request message storing, by the physical camera module, the image acquisition parameter in the virtual camera module, invoking, by the physical camera module, the first camera to acquire the first image based on the first request message, and returning, by the physical camera module, a first data frame to the first application, wherein the first data frame comprises the first image and an image acquisition parameter.

2. The method according to claim 1, wherein the image acquisition parameter comprises at least one of the following:

a maximum frame rate, an exposure compensation value, and a coding scheme that are of an acquired image.

3. The method according to claim 1, wherein the second electronic device is an electronic device that establishes a multi-screen collaboration connection to the first electronic device.

4. The method according to claim 1, wherein the switching, by the first electronic device, a camera for image acquisition to a second camera specifically comprises:

sending, by the first application, a first switching instruction to the camera service module;

sending, by the camera service module, first indication information to the physical camera module, wherein the first indication information is configured to indicate the physical camera module to forward a request message sent by the camera service module to the virtual camera module;

sending, by the camera service module, a second request message to the physical camera module;

sending, by the physical camera module, the second request message to the virtual camera module;

invoking, by the virtual camera module, the second camera to acquire the second image based on the second request message;

returning, by the virtual camera module, a second data frame to the first application, wherein the second data frame comprises the second image and an image acquisition parameter; and caching, by the virtual camera module, the second data frame in the buffer.

5. The method according to claim 4, wherein each second data frame cached in the buffer carries an image acquisition parameter.

6. The method according to claim 4, wherein before the invoking, by the virtual camera module, the second camera to acquire the second image based on the second request message, the method further comprises:

detecting, by the virtual camera module, whether an image acquisition parameter exists in the second request message; and if the image acquisition parameter exists in the second request message, replacing, by the virtual camera module, an image acquisition parameter stored in the virtual camera module with the image acquisition parameter in the second request message.

7. The method according to claim 4, wherein after the responding to a second input operation performed on the switching control, the method further comprises:

determining, by the camera service module, whether each data frame in the buffer carries an image acquisition parameter;

if it is determined that each data frame in the buffer carries the image acquisition parameter, sending, by the camera service module, a third request message to the physical camera module;

sending, by the physical camera module, the third request message to the virtual camera module;

invoking, by the virtual camera module, the third camera to acquire the third image based on the third request message; and returning, by the virtual camera module, a third data frame to the camera service module, wherein the third data frame comprises the third image and image acquisition information.

8. The method according to claim 7, wherein before the invoking, by the virtual camera module, the third camera to acquire the third image based on the third request message, the method further comprises:

detecting, by the virtual camera module, whether an image acquisition parameter exists in the third request message; and if the image acquisition parameter exists in the third request message, replacing, by the virtual camera module, an image acquisition parameter stored in the virtual camera module with the image acquisition parameter in the third request message.

9. A first electronic device, comprising:

a memory, a processor, and a touch control screen, wherein the touch control screen is configured to display content; the memory is configured to store a computer program, and the computer program comprises program instructions; and the processor is configured to invoke the program instructions, so that the first electronic device performs the following operations:

displaying a first interface, wherein the first interface comprises a preview area and a switching control, the preview area displays a first image, the first image is an image acquired by a first camera, the first camera is a camera of the first electronic device, and the first image is acquired by the first camera based on a parameter value of an image acquisition parameter;

switching a camera for image acquisition to a second camera at a first moment in response to a first input operation, wherein the second camera is a camera of a second electronic device;

displaying a second image in the preview area at a second moment, wherein the second image is an image acquired by the second camera, and during image acquisition by the second camera, a data frame cached in a buffer carries the image acquisition parameter;

responding to a second input operation performed on the switching control at a third moment; and displaying a third image in the preview area at a fourth moment, wherein the third image is an image acquired by a third camera, and the third camera is a camera of the second electronic device;

wherein the first electronic device further comprises a first application, a camera service module, a physical camera module, and a virtual camera module, and before displaying the first interface, the operations further comprise:

detecting a third input operation, and starting the first application, sending, by the camera service module a first request message to the physical camera module, when it is detected that an image acquisition parameter exists in the first request message, storing, by the physical camera module, the image acquisition parameter in the virtual camera module, invoking, by the physical camera module, the first camera to acquire the first image based on the first request message, and returning by the physical camera module, a first data frame to the first application, wherein the first data frame comprises the first image and an image acquisition parameter.

10. The first electronic device according to claim 9, wherein the image acquisition parameter comprises at least one of the following:

a maximum frame rate, an exposure compensation value, and a coding scheme that are of an acquired image.

11. The first electronic device according to claim 9, wherein the second electronic device is an electronic device that establishes a multi-screen collaboration connection to the first electronic device.

12. The first electronic device according to claim 9, wherein switching a camera for image acquisition to a second camera specifically comprises:

sending, by the first application, a first switching instruction to the camera service module;

sending, by the camera service module, first indication information to the physical camera module, wherein the first indication information is configured to indicate the physical camera module to forward a request message sent by the camera service module to the virtual camera module;

sending, by the camera service module, a second request message to the physical camera module;

sending, by the physical camera module, the second request message to the virtual camera module;

invoking, by the virtual camera module, the second camera to acquire the second image based on the second request message;

returning, by the virtual camera module, a second data frame to the first application, wherein the second data frame comprises the second image and an image acquisition parameter; and caching, by the virtual camera module, the second data frame in the buffer.

13. The first electronic device according to claim 12, wherein each second data frame cached in the buffer carries an image acquisition parameter.

14. The first electronic device according to claim 12, wherein before invoking the second camera to acquire the second image based on the second request message, the operations further comprise:

detecting, by the virtual camera module, whether an image acquisition parameter exists in the second request message; and if the image acquisition parameter exists in the second request message, replacing, by the virtual camera module, an image acquisition parameter stored in the virtual camera module with the image acquisition parameter in the second request message.

15. The first electronic device according to claim 12, wherein after the responding to a second input operation performed on the switching control, the operations further comprise:

determining, by the camera service module, whether each data frame in the buffer carries an image acquisition parameter;

if it is determined that each data frame in the buffer carries the image acquisition parameter, sending, by the camera service module, a third request message to the physical camera module;

sending, by the physical camera module, the third request message to the virtual camera module;

invoking, by the virtual camera module, the third camera to acquire the third image based on the third request message; and returning, by the virtual camera module, a third data frame to the camera service module, wherein the third data frame comprises the third image and image acquisition information.

16. The first electronic device according to claim 15, wherein before the invoking, by the virtual camera module, the third camera to acquire the third image based on the third request message, the method further comprises:

detecting, by the virtual camera module, whether an image acquisition parameter exists in the third request message; and if the image acquisition parameter exists in the third request message, replacing, by the virtual camera module, an image acquisition parameter stored in the virtual camera module with the image acquisition parameter in the third request message.

17. A computer-readable storage medium, wherein the computer-readable storage medium stores a computer program, and the computer program, when executed by a processor of a first electronic device, implements a method, the method comprising:

displaying a first interface, wherein the first interface comprises a preview area and a switching control, the preview area displays a first image, the first image is an image acquired by a first camera, the first camera is a camera of the first electronic device, and the first image is acquired by the first camera based on a parameter value of an image acquisition parameter;

switching a camera for image acquisition to a second camera at a first moment in response to a first input operation, wherein the second camera is a camera of a second electronic device;

displaying a second image in the preview area at a second moment, wherein the second image is an image acquired by the second camera, and during image acquisition by the second camera, a data frame cached in a buffer carries the image acquisition parameter;

responding to a second input operation performed on the switching control at a third moment; and displaying a third image in the preview area at a fourth moment, wherein the third image is an image acquired by a third camera, and the third camera is a camera of the second electronic device;

wherein the first electronic device comprises a first application, a camera service module, a physical camera module, and a virtual camera module, and before displaying the first interface, the method further comprises:

detecting a third input operation, and starting the first application, sending, by the camera service module, a first request message to the physical camera module, when it is detected that an image acquisition parameter exists in the first request message, storing, by the physical camera module, the image acquisition parameter in the virtual camera module, invoking, by the physical camera module, the first camera to acquire the first image based on the first request message, and returning, by the physical camera module, a first data frame to the first application, wherein the first data frame comprises the first image and an image acquisition parameter.

* * * * *